US010034295B2

(12) United States Patent
Talukdar et al.

(10) Patent No.: US 10,034,295 B2
(45) Date of Patent: Jul. 24, 2018

(54) COORDINATION OF DOWNLINK CHANNEL ASSIGNMENTS FOR COMMUNICATION WITH CLUSTER OF ACCESS POINTS IN WIRELESS NETWORK

(71) Applicant: NOKIA SOLUTIONS AND NETWORKS OY, Espoo (FI)

(72) Inventors: Anup Talukdar, Glendale Heights, IL (US); Mark Cudak, Rolling Meadows, IL (US); Ahmad Awada, Munich (DE); Christian Mahr, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 230 days.

(21) Appl. No.: 14/800,211

(22) Filed: Jul. 15, 2015

(65) Prior Publication Data
US 2017/0019903 A1    Jan. 19, 2017

(51) Int. Cl.
*H04W 4/00* (2018.01)
*H04W 72/08* (2009.01)
(Continued)

(52) U.S. Cl.
CPC ............ *H04W 72/08* (2013.01); *H04B 7/086* (2013.01); *H04W 16/28* (2013.01); *H04W 24/00* (2013.01);
(Continued)

(58) Field of Classification Search
None
See application file for complete search history.

(56) References Cited

U.S. PATENT DOCUMENTS

| 5,913,169 A * | 6/1999 | Vaara | H04B 7/2606 |
| | | | 455/443 |
| 6,925,068 B1 * | 8/2005 | Stanwood | H04W 72/10 |
| | | | 370/329 |

(Continued)

FOREIGN PATENT DOCUMENTS

| EP | 2448340 A1 | 5/2012 |
| EP | 2627141 A2 | 8/2013 |

(Continued)

OTHER PUBLICATIONS

International Search Report and Written Opinion for International Application PCT/EP2016/063693, dated Sep. 9, 2016, 11 pages.
(Continued)

Primary Examiner — Bob Phunkulh
(74) Attorney, Agent, or Firm — Brake Hughes Bellermann LLP

(57) ABSTRACT

An example technique may include determining, by a user device, downlink control channel timing information for each of a plurality of access points including for a serving access point that serves the user device and one or more standby access points; sending, by the user device to a cluster set manager via the serving access point, the downlink control channel timing information for each of the plurality of access points; receiving, by the user device from the cluster set manager via the serving access point, downlink control channel allocations including information identifying a downlink control channel allocated to the user device for each of a plurality of the access points; and receiving, by the user device, information from at least one of a plurality of the access points via a downlink control channel allocated to the user device for the at least one of the plurality of access points.

21 Claims, 12 Drawing Sheets

(51) Int. Cl.
*H04W 24/00* (2009.01)
*H04W 72/04* (2009.01)
*H04B 7/08* (2006.01)
*H04W 16/28* (2009.01)
*H04W 28/16* (2009.01)
*H04W 28/02* (2009.01)
*H04W 88/08* (2009.01)

(52) U.S. Cl.
CPC ....... *H04W 28/16* (2013.01); *H04W 72/0406* (2013.01); *H04W 28/0247* (2013.01); *H04W 88/08* (2013.01)

(56) References Cited

U.S. PATENT DOCUMENTS

| | | | |
|---|---|---|---|
| 7,127,252 | B1 | 10/2006 | Uchishima et al. |
| 2005/0176385 | A1* | 8/2005 | Stern-Berkowitz ... H04W 36/18 455/101 |
| 2011/0116476 | A1* | 5/2011 | Lee ................ H04W 52/241 370/331 |
| 2011/0255486 | A1* | 10/2011 | Luo ................ H04W 48/12 370/329 |
| 2012/0057535 | A1* | 3/2012 | Zhang ............ H04W 72/0426 370/329 |
| 2013/0083780 | A1* | 4/2013 | Luo ................ H04W 72/0406 370/336 |
| 2013/0114530 | A1* | 5/2013 | Chen ............... H04W 72/042 370/329 |
| 2014/0198676 | A1* | 7/2014 | Han ................ H04W 24/10 370/252 |
| 2015/0036666 | A1* | 2/2015 | Blankenship ..... H04W 72/044 370/336 |
| 2015/0043390 | A1* | 2/2015 | Wang .............. H04W 24/02 370/280 |
| 2015/0230112 | A1* | 8/2015 | Siomina ........... G01S 5/0205 370/252 |
| 2016/0212680 | A1* | 7/2016 | Talukdar .......... H04W 40/12 |

FOREIGN PATENT DOCUMENTS

| | | |
|---|---|---|
| JP | 2007243377 A | 9/2007 |
| WO | 2013051873 A1 | 4/2013 |
| WO | 2014009246 A1 | 1/2014 |
| WO | 2014009250 A1 | 1/2014 |
| WO | 2014049198 A1 | 4/2014 |

OTHER PUBLICATIONS

"Coordinated multi-point operation for LTE physical layer aspects", 3rd Generation Partnership Project, Technical Specification Group Radio Access Network, Release 11, 3GPP TR 36.819 version 11.2.0, Sep. 2013, 70 pages.

Talukdar, Anup et al., "Handoff Rates for Millimeterwave 5G Systems", Proc. IEEE VTC, May 18, 2014, 5 pages.

Cudak, Mark et al., "Moving Towards MMWave-Based Beyond-4G (B-4G) Technology", Proc. IEEE VTC, Jun. 2, 2013, 5 pages.

* cited by examiner

COORDINATION OF DOWNLINK CHANNEL ASSIGNMENTS FOR COMMUNICATION WITH CLUSTER OF ACCESS POINTS IN WIRELESS NETWORK

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed.

Mobile stations or user devices (e.g., smart phones or other mobile devices or wireless devices) may be served or connected to a serving access point (AP). However, some situations may arise that may cause the user device to lose its connection to the serving AP.

SUMMARY

According to an example implementation, a method of communicating with a plurality of access points may include determining, by a user device, downlink control channel timing information for each of a plurality of access points including for a serving access point that serves the user device and one or more standby access points; sending, by the user device to a cluster set manager via the serving access point, the downlink control channel timing information for each of the plurality of access points; receiving, by the user device from the cluster set manager via the serving access point, downlink control channel allocations including information identifying a downlink control channel allocated to the user device for each of a plurality of the access points; and receiving, by the user device, information from at least one of a plurality of the access points via a downlink control channel allocated to the user device for the at least one of the plurality of access points.

According to another example implementation, an apparatus may include at least one processor and at least one memory including computer instructions, when executed by the at least one processor, cause the apparatus to: determine, by a user device, downlink control channel timing information for each of a plurality of access points including for a serving access point that serves the user device and one or more standby access points; send, by the user device to a cluster set manager via the serving access point, the downlink control channel timing information for each of the plurality of access points; receive, by the user device from the cluster set manager via the serving access point, downlink control channel allocations including information identifying a downlink control channel allocated to the user device for each of a plurality of the access points; and receiving, by the user device, information from at least one of a plurality of the access points via a downlink control channel allocated to the user device for the at least one of the plurality of access points.

According to another example implementation, a computer program product may include a computer-readable storage medium and storing executable code that, when executed by at least one data processing apparatus, is configured to cause the at least one data processing apparatus to perform a method including: determining, by a user device, downlink control channel timing information for each of a plurality of access points including for a serving access point that serves the user device and one or more standby access points; sending, by the user device to a cluster set manager via the serving access point, the downlink control channel timing information for each of the plurality of access points; receiving, by the user device from the cluster set manager via the serving access point, downlink control channel allocations including information identifying a downlink control channel allocated to the user device for each of a plurality of the access points; and receiving, by the user device, information from at least one of a plurality of the access points via a downlink control channel allocated to the user device for the at least one of the plurality of access points.

According to another example implementation, an apparatus may include means for determining, by a user device, downlink control channel timing information for each of a plurality of access points including for a serving access point that serves the user device and one or more standby access points; means for sending, by the user device to a cluster set manager via the serving access point, the downlink control channel timing information for each of the plurality of access points; receiving, by the user device from the cluster set manager via the serving access point, downlink control channel allocations including information identifying a downlink control channel allocated to the user device for each of a plurality of the access points; and means for receiving, by the user device, information from at least one of a plurality of the access points via a downlink control channel allocated to the user device for the at least one of the plurality of access points.

According to another example implementation, a method may include: receiving, by a cluster set manager from a user device, downlink control channel timing information for each of a plurality of access points for the user device; determining, by the cluster set manager, a cluster set of access points for the user device; determining, by the cluster set manager based on the downlink control channel timing information, a downlink control channel allocated to the user device for each access point of the cluster set of access points, wherein the downlink control channels allocated to access points of the cluster set of access points for the user device are non-overlapping in time; and, sending, by the cluster set manager to the user device, the downlink control channel allocations including information identifying a downlink control channel allocated to the user device for each access point of the cluster set of access points.

According to another example implementation, an apparatus may include at least one processor and at least one memory including computer instructions, when executed by the at least one processor, cause the apparatus to: receive, by a cluster set manager from a user device, downlink control channel timing information for each of a plurality of access points for the user device; determine, by the cluster set manager, a cluster set of access points for the user device; determine, by the cluster set manager based on the downlink control channel timing information, a downlink control channel allocated to the user device for each access point of the cluster set of access points, wherein the downlink control channels allocated to access points of the cluster set of access points for the user device are non-overlapping in time; and send, by the cluster set manager to the user device, the downlink control channel allocations including information identifying a downlink control channel allocated to the user device for each access point of the cluster set of access points.

According to another example implementation, a computer program product may include a computer-readable storage medium and storing executable code that, when executed by at least one data processing apparatus, is configured to cause the at least one data processing apparatus to perform a method including: receiving, by a cluster set manager from a user device, downlink control channel timing information for each of a plurality of access points for the user device; determining, by the cluster set manager, a cluster set of access points for the user device; determining, by the cluster set manager based on the downlink control channel timing information, a downlink control channel allocated to the user device for each access point of the cluster set of access points, wherein the downlink control channels allocated to access points of the cluster set of access points for the user device are non-overlapping in time; and sending, by the cluster set manager to the user device, the downlink control channel allocations including information identifying a downlink control channel allocated to the user device for each access point of the cluster set of access points.

According to another example implementation, an apparatus may include means for receiving, by a cluster set manager from a user device, downlink control channel timing information for each of a plurality of access points for the user device; means for determining, by the cluster set manager, a cluster set of access points for the user device; means for determining, by the cluster set manager based on the downlink control channel timing information, a downlink control channel allocated to the user device for each access point of the cluster set of access points, wherein the downlink control channels allocated to access points of the cluster set of access points for the user device are non-overlapping in time; and means for sending, by the cluster set manager to the user device, the downlink control channel allocations including information identifying a downlink control channel allocated to the user device for each access point of the cluster set of access points.

According to an example implementation, a method may include determining, by a user device, downlink control channel timing information for each of a plurality of access points including for a serving access point that serves the user device and one or more standby access points; determining, by the user device based on the downlink control channel timing information, a downlink control channel allocated to the user device for each access point of a cluster set of access points, wherein the downlink control channels allocated to access points of the cluster set of access points for the user device are non-overlapping in time; and sending, by the user device to a cluster set manager, the downlink control channel allocations including information identifying a downlink control channel allocated to the user device for each access point of the cluster set of access points.

According to another example implementation, an apparatus may include at least one processor and at least one memory including computer instructions, when executed by the at least one processor, cause the apparatus to: determine, by a user device, downlink control channel timing information for each of a plurality of access points including for a serving access point that serves the user device and one or more standby access points; determine, by the user device based on the downlink control channel timing information, a downlink control channel allocated to the user device for each access point of a cluster set of access points, wherein the downlink control channels allocated to access points of the cluster set of access points for the user device are non-overlapping in time; and send, by the user device to a cluster set manager, the downlink control channel allocations including information identifying a downlink control channel allocated to the user device for each access point of the cluster set of access points.

According to another example implementation, a computer program product may include a computer-readable storage medium and storing executable code that, when executed by at least one data processing apparatus, is configured to cause the at least one data processing apparatus to perform a method including: determining, by a user device, downlink control channel timing information for each of a plurality of access points including for a serving access point that serves the user device and one or more standby access points; determining, by the user device based on the downlink control channel timing information, a downlink control channel allocated to the user device for each access point of a cluster set of access points, wherein the downlink control channels allocated to access points of the cluster set of access points for the user device are non-overlapping in time; and sending, by the user device to a cluster set manager, the downlink control channel allocations including information identifying a downlink control channel allocated to the user device for each access point of the cluster set of access points.

According to another example implementation, an apparatus may include means for determining, by a user device, downlink control channel timing information for each of a plurality of access points including for a serving access point that serves the user device and one or more standby access points; means for determining, by the user device based on the downlink control channel timing information, a downlink control channel allocated to the user device for each access point of a cluster set of access points, wherein the downlink control channels allocated to access points of the cluster set of access points for the user device are non-overlapping in time; and means for sending, by the user device to a cluster set manager, the downlink control channel allocations including information identifying a downlink control channel allocated to the user device for each access point of the cluster set of access points.

The details of one or more examples of implementations are set forth in the accompanying drawings and the description below. Other features will be apparent from the description and drawings, and from the claims.

DETAILED DESCRIPTION

Figure 1:
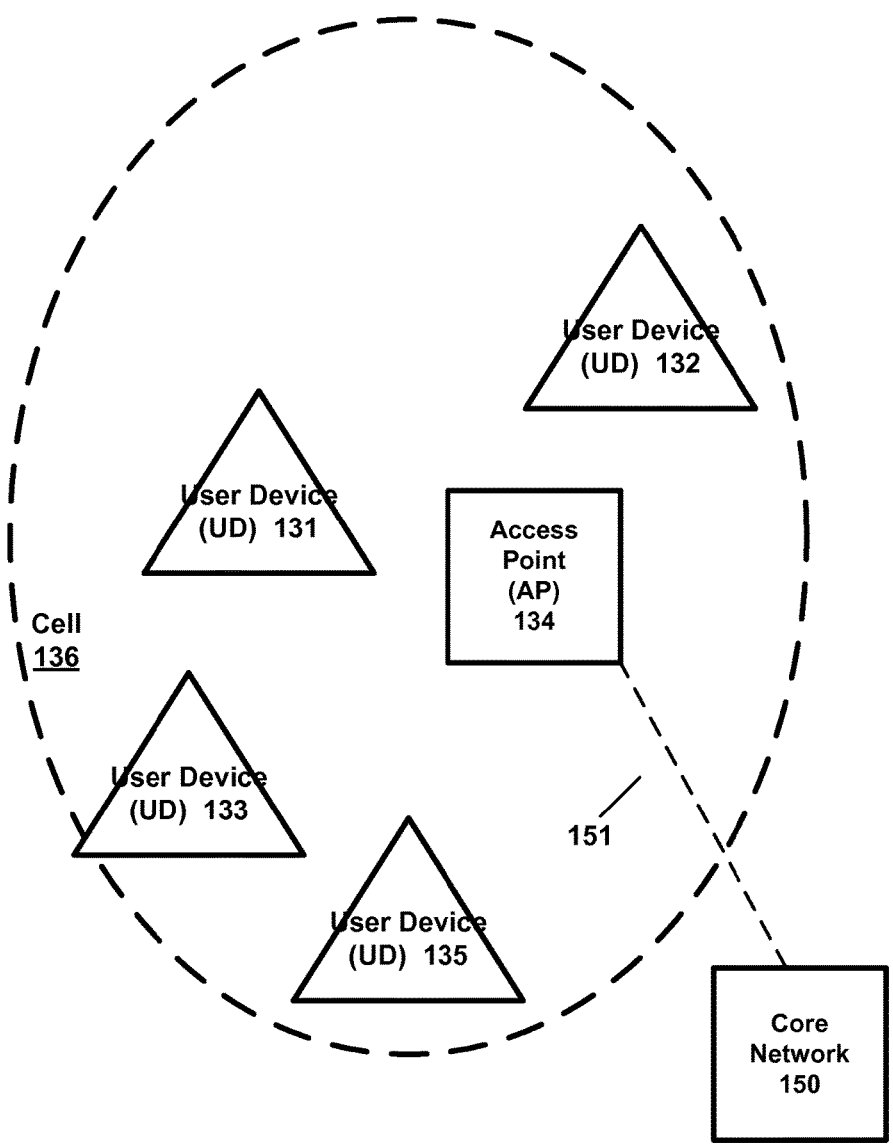
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user devices (UDs), may be connected (and in communication) with an access point (AP), which may also be referred to as a base station (BS) or an enhanced Node B (eNB). At least part of the functionalities of an access point (AP), base station (BS) or (e)Node B (eNB) may be also be carried out by any node, server or host which may be operably coupled to a transceiver, such as a remote radio head. AP 134 provides wireless coverage within a cell 136, including to user devices 131, 132, 133 and 135. Although only four user devices are shown as being connected or attached to AP 134, any number of user devices may be provided. AP 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, and/or mmWave band networks, or any other wireless network. LTE, 5G and mmWave band networks are provided only as illustrative examples, and the various example implementations may be applied to any wireless technology/wireless network.

Figure 2:
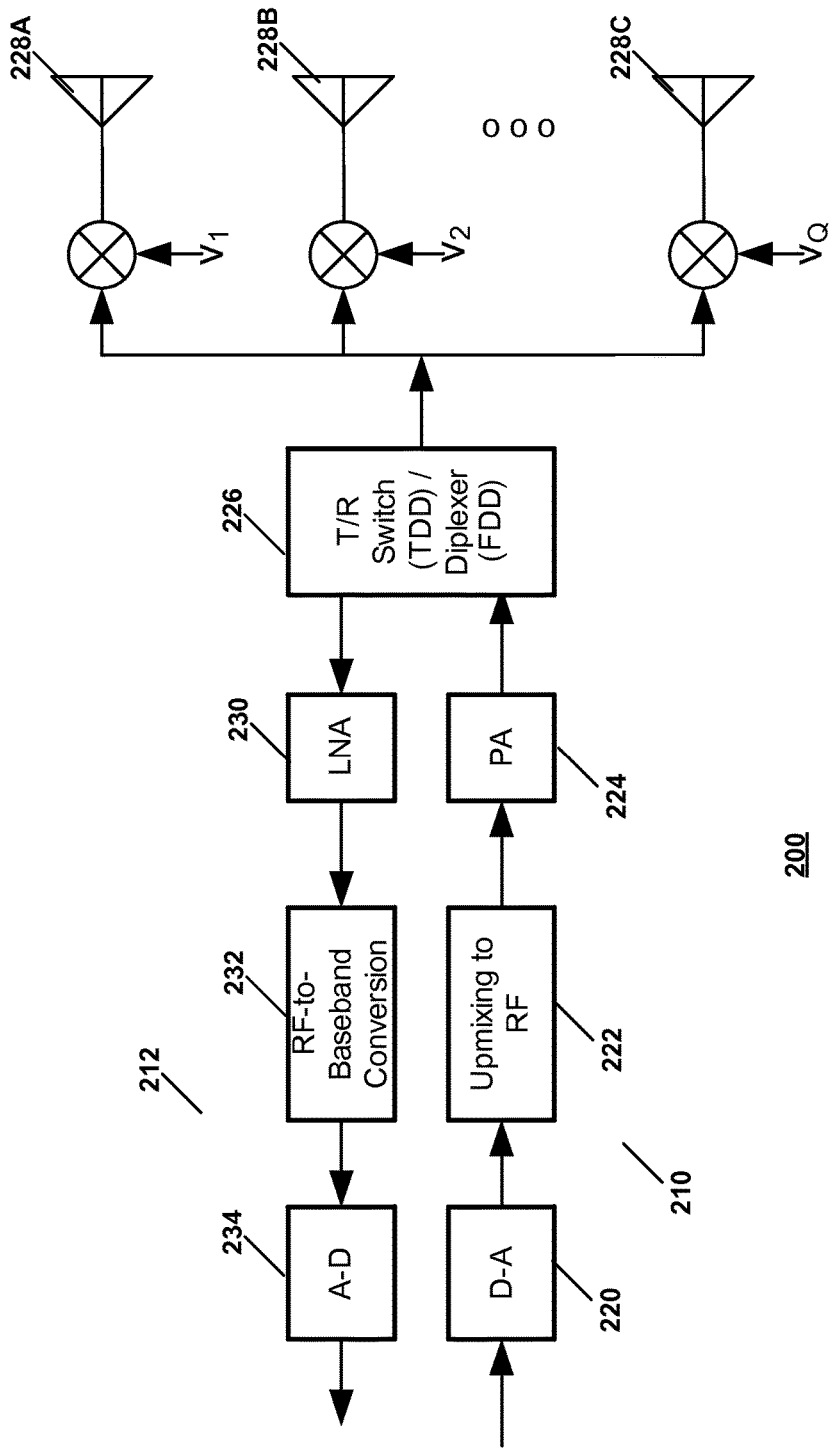
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights $V_1, V_2, \ldots$ or $V_Q$ is mixed with the signal to apply a gain and phase to the signal for transmission. For example, a gain and phase, $V_1, V_2, \ldots$ or $V_Q$, may be applied to the signal output from the T/R switch 226 to scale the signal transmitted by each antenna (e.g., the signal is multiplied by $V_1$ before being transmitted by antenna 1 228A, the signal is multiplied by $V_2$ before being transmitted by antenna 2 228B, and so on), where the phase may be used to steer or point a beam transmitted by the overall antenna array, e.g., for directional beam steering. Thus, the beam weights $V_1, V_2, \ldots$ or $V_Q$ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

One challenge that may exist for at least some high performance wireless networks (e.g., 5G and/or mmWave band networks) is the propagation characteristics of such 5G or mmWave bands networks, and the increased possibility of dropped connections (or interrupted wireless service) due to interference from objects, fading and other situations.

As an illustrative example, the propagation characteristics in the mmWave band are more challenging than traditional cellular. Diffraction at mmWave bands is effectively non-existent (or at least very low) and propagation behaves similar to visible light. Transmission through most objects is diminished where foliage and other common obstacles can produce severe shadowing. Reflective power, on the other hand, is improved offering new opportunities for completing the link, but may be 15 dB-40 dB weaker (than the main signal path). In a typical urban deployment, 5G or mmWave access points (APs) may, for example, be installed on top of street-side poles, possibly at street corners; other deployment scenarios are stadiums, college campus courtyards, tourist hotspots.

The severe shadowing loss characteristics in the mmWave band suggests (or at least makes it more likely) that, the radio link between a user device (UD) and its serving AP will be disrupted if the line of sight (LOS) between UD and AP is blocked by obstacles. For a pedestrian walking along the sidewalk in a city block, its LOS may be blocked by fixed obstacles, such as trees, or moving obstacle such as large trucks, or other pedestrians. In a campus courtyard or a tourist hotspot LOS blocking may be caused by crowds. Other types of LOS blocking may be caused by user motions such as hand or body rotations. According to an example implementation, in order to deliver reliable connectivity (or at least improved reliability of the wireless connection/service for the UD) to a user/UD in presence of obstacles, a mmWave access point network may be built with enough redundancies of APs such that in the event of a LOS blocking, the network connection of the UD can be rapidly rerouted via another AP.

According to an example implementation, each UD in a wireless (e.g., 5G or mmWave) network may served by a cluster of APs, which may be referred to as a cluster set of APs for the UD. Members of the cluster set of a UD may, for example, be selected based on the accessibility of the APs from the UD, e.g., based on received signal strength or RSSI of signal received by UD from each AP, e.g., select the three APs providing the greatest received signal strength as measured by the UD, for example. In example implementations, a UD may have a different cluster set than one or more other UDs, or a first UD may have a cluster set that at least partially overlaps (e.g., shares one or more APs) with the cluster set of a second UD.

According to an example implementation, among the APs in the cluster set, one particular AP can be selected as the serving AP for the UD, through which the network communicates with the UD; the other APs are designated as standby APs (or alternative APs), which may be used in a standby manner, e.g., to be used when necessary, or when a problem or failure occurs with a serving AP (or when a service interruption occurs in the serving AP-UD connection), or for other reason (e.g., to increase throughput or decrease delay of data communications for the UD). For example, a standby AP may be used to reroute the UD's network connection when its radio link to the serving AP is blocked or fails. According to an example implementation, in order to allow communication with both a serving AP and the standby APs of the cluster set, the UD may typically maintain continuous connectivity with each member (AP) of its cluster set of APs by maintaining synchronization with the symbol and frame structure, downlink and uplink control channels, and also maintain beam synchronization by selecting best beams for DL and UL communication with each AP of the cluster set. Although the standby APs (or alternative APs) of a cluster set for a UD are primarily intended to be used to provide robust connectivity to the network in the event of radio link blockages, the standby APs may also be used to improve the network performance, or improve data throughput for the UD. For example, during uplink access procedure (where the UD requests for allocation of uplink radio resources) a UD may send uplink resource requests over the uplink access opportunities (such uplink random access channel or uplink polling channel) of the standby APs (or alternative APs). This method may reduce the uplink access latency and also improves robustness of uplink access in presence of frequent radio link blockages.

Figure 3:
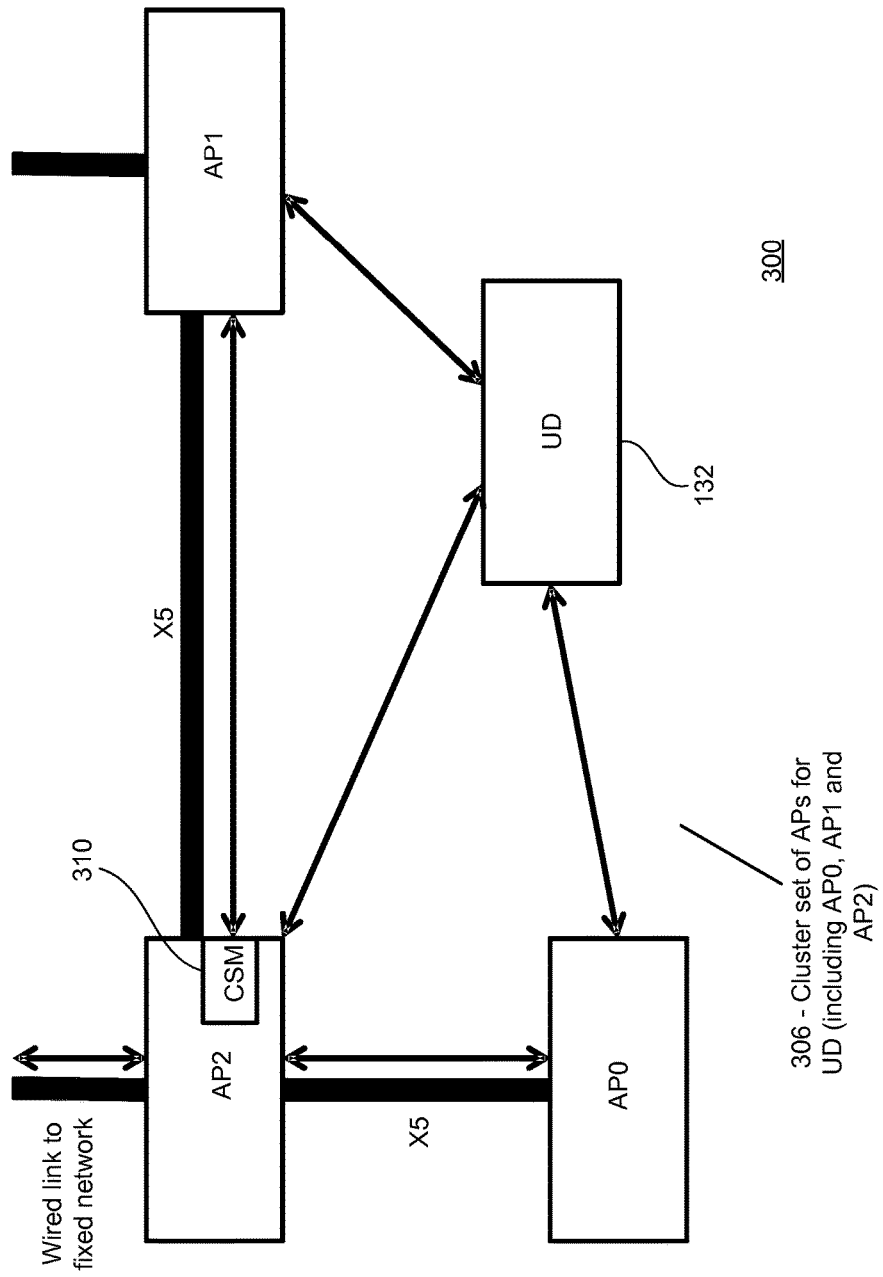
FIG. 3 is a diagram illustrating a wireless network 300 including a cluster set of access points (APs) for a user device (UD) according to an example implementation.

FIG. 3 is a diagram illustrating a wireless network 300 including a cluster set of access points (APs) for a user device (UD) according to an example implementation. In this illustrative example, network 300 may include a user device (UD) 132. Network 300 also includes a cluster set (306) of APs for the UD 132. The cluster set 306 may include a serving AP, AP0, and two standby APs, AP1 and AP2. According to an example implementation, cluster set (306) of APs (including, for example, AP0, AP 1 and AP2 in this example) may be configured and managed by a Cluster Set Manager (CSM) 310. CSM 310 may be provided on an AP, such as AP2 in this example, or other location within the network, e.g., within core network 150. A logical instance of CSM 310 may be provided for each UD. The location of the CSM may for example, be close to the APs in the cluster set to enable low-latency communication with those APs and the UD, e.g., and may be provided or running on a same computer/computing system, or nearby to one of the APs in the cluster set 306, as an example. In this example configuration of wireless network 300 of FIG. 1, AP0 is the serving AP (currently serving the UD 132), whereas AP1 and AP2 are standby APs (alternative APs) for the UD 132. Each of the APs (AP0, AP1 and AP2) of the cluster set 306 may be in communication with the other APs via an X5 (wired) interface. Each AP may also be in communication with the UD 132 via a wireless-interface or air-interface.

According to an example implementation, as described in greater detail herein, CSM 310 may configure and manage the APs of cluster set 306, and may also manage aspects of the UD 132. For example, CSM 310 may receive downlink control channel timing information, received signal strength information (RSSI) with respect to multiple APs, and possibly other information, from UD 132. The downlink control channel timing and RSSI may be measured by the UD (from the perspective of the UD 132). Also, in the event of a service interruption with respect to the serving AP, CSM 310 may operate to relay commands or information from the serving AP to one of the standby APs, for forwarding to the UD 132.

Also, CSM 310 may identify a set of APs to be part of a cluster set 306 (e.g., based on received signal strength, which may include identifying a best set of APs for the cluster set 306). CSM 310 may also determine downlink control channels to be used for each AP of the cluster set 306 to communicate with UD 132. For example, CSM 310 may determine downlink Control channel allocations/assignments in order to avoid overlap between the downlink control channels or to ensure that the downlink control channels for the UD satisfy some minimum separation requirements, depending on the receiver configuration of the UD 132 (e.g., either an omnidirectional receiver that may require non-overlapping downlink control channels for the UD, or a beamforming receiver that may require separation between downlink control channels of at least a beamswitching time). Also, for example CSM 310 may send messages to the UD 132 and to each AP of the cluster set 306 to inform them of the downlink control channel allocations.

Alternatively, UD 132 may determine downlink control channel allocations/assignments for the UD to communicate with each AP of the cluster set, e.g., which downlink control channel should be used/received by the UD for each AP of the cluster set. In this alternative example implementation, the UD 132 may then send a message to the CSM 310 and/or to each of the APs to inform them of the downlink control channel allocations for the APs of the cluster set 306 to communicate with the UD 132.

Figure 4:
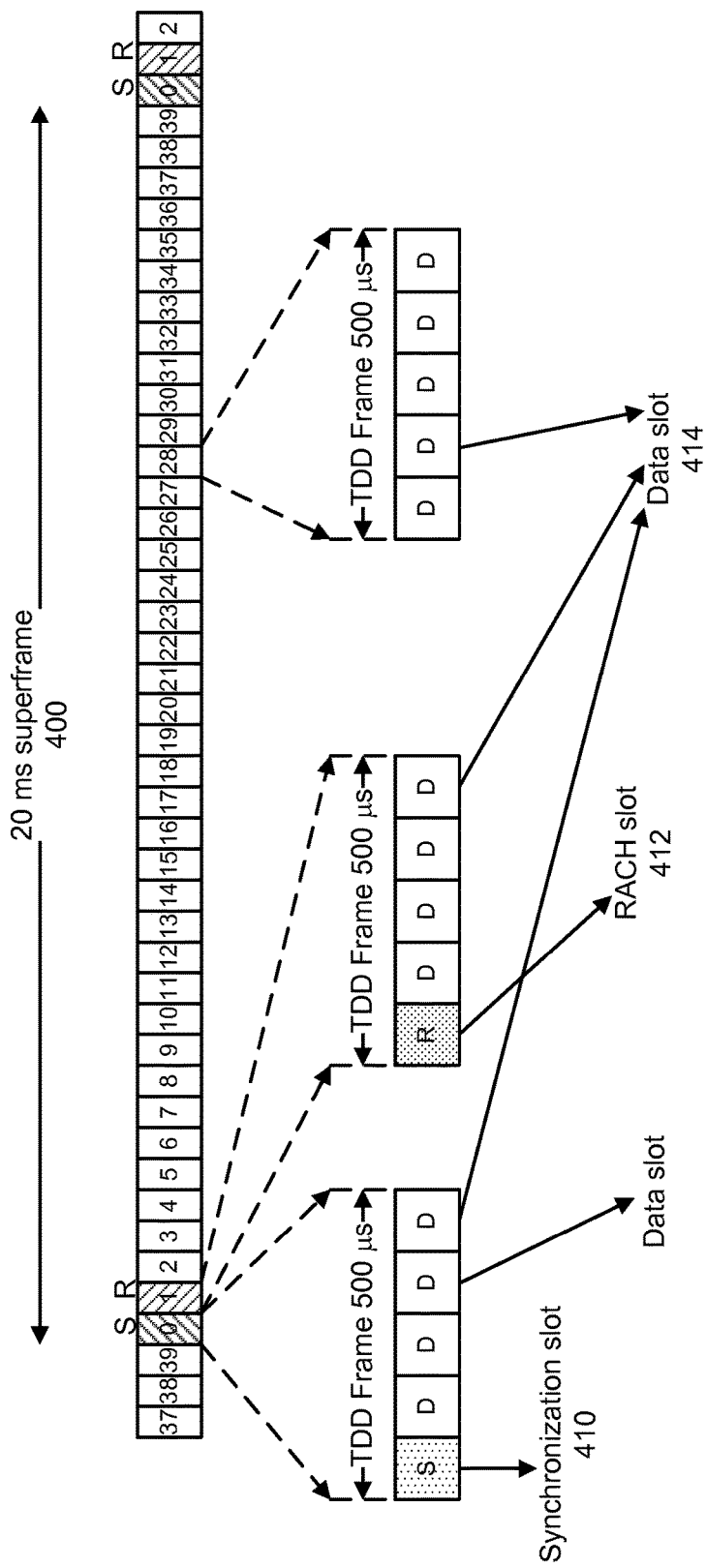
FIG. 4 is a diagram illustrating an air-interface frame structure according to an illustrative example implementation.

FIG. 4 is a diagram illustrating an air-interface frame structure according to an illustrative example implementation. Referring to FIG. 4, a 20 msec superframe 400 is subdivided into 40 subframes (subframes 0-39 for one superframe 400). Each subframe may have, for example, a duration of 500 microseconds. Each subframe may be further divided into 5 slots, with each slot having a duration of 100 microseconds. According to an illustrative example implementation, a slot may be a synchronization slot 410, uplink random access channel (RACH) slot 412, or a data slot 414. Slots 410, 412 and 414 are examples of these type of slots. A synchronization slot may be used for system acquisition and also for UD specific beam synchronization. For example, synchronization signals may be received by the UD 132 from an AP, and the UD 132 may determine timing or synchronization for the AP based on these synchronization signals. The synchronization channel (via a synchronization slot) is transmitted every 20 msec. The RACH slot can be used by a UD to send an uplink resource request and additionally it can also be used by the UDs to provide feedback on beam selection (e.g., to identify a best RF beam for the AP).

A data slot may include downlink control information, uplink control information (e.g., to allow a UD to send ARQ ACK/NAKs to an AP, and/or to allow a UD to request uplink resources from an AP), and data (either uplink or downlink data). For example, the downlink control information in a data slot may communicate downlink/uplink resource allocations to UDs, and/or communicate various commands for configuration of the UD functions. This downlink control information included within a data slot may, for example, include multiple downlink control channels, e.g., DC0 (downlink control channel 0), DC1 (downlink control channel 1), DC2 (downlink control channel 2), etc., and each downlink control channel (e.g., DC1, DC2) may be allocated to a different UD. Thus, each downlink control channel a data slot may indicate downlink/uplink resources allocated to the UD and commands for configuring the UD, for example. User-specific beamforming (or UD-specific beamforming) may be used for each downlink control channel (e.g., DC0, DC1, DC2).

For improved efficiency, communications over the data slot 414 may use user-specific beamforming. Thus, for example, each downlink control channel within a data slot may be directed/addressed to a specific UD, and thus, may use UD-specific beamforming to improve performance. An AP may configure its transmitter (receiver) with the UD-specific beamforming weights for transmission (reception) to (from) an UD over the control and data channels. An UD may configure its transmitter (receiver) with the AP-specific beamforming weights for transmission (reception) to (from) an AP over the control and data channels. An UD may also opt to use an omni-directional receiver/transmitter to communicate with the APs.

According to an illustrative example implementation, in a mmWave system or a 5G system, the UD 132 may typically need to monitor the downlink control channels of multiple APs in its cluster set for fast and efficient rapid-rerouting, and also for low-latency and robust uplink access. In an example implementation, monitoring a downlink control channel received from an AP may include, for example, performing one or more of the following: pointing the UD's antenna to the AP using a beam/beam weights specific to the AP; receiving and decoding signals of the downlink control channel and determining if the downlink control channel is addressed to the UD; and receiving any resource allocations and/or other information that may be sent via the downlink control channel that is addressed (or directed to) the UD.

According to an example implementation, upon detection of a radio link blockage (or wireless service/connection failure for wireless connection between serving AP and UD, which, for example, may be based on the serving AP not receiving an expected ACK/Acknowledgement from UD within a timeout time period), the serving AP may send a request to a standby AP (or alternate AP) in the cluster set to serve the UD. Then, the standby AP may send a handover command to the UD over its downlink control channel requesting the UD to perform handover from the serving AP to the (requesting) standby AP. Thus, according to an example implementation, the UD may need to monitor the downlink control channels of one or more standby APs in the cluster set, in addition to monitoring the downlink control channel of the serving AP (the downlink control channel assigned to the UD for the serving AP). In an example low-latency and robust uplink access scheme, the UD may perform an uplink access (e.g., by sending a resource request via the uplink control information to standby AP) to a non-serving AP (e.g., a standby AP in the cluster set). In response to sending a resource request, the UD may then need to monitor the downlink control channel of this standby AP for the responses, e.g., to receive any resource grants from the standby AP, in addition to monitoring the downlink control channel of its serving AP for resource grants/allocations from the serving AP to the UD.

The slot timings of the different APs, as observed by a UD, depend on the propagation times of the signal from the APs to the UD. In addition, due to limitations of the time synchronization methods, the frame structures of different APs are not perfectly synchronized and this synchronization error may also impact the relative slot timings of different APs at an UD. In order to monitor the downlink (DL) control channels of multiple APs within a slot, the UD should determine the timing of the control channels of the APs. Also, depending on the type of the UD receiver, either: 1) omni-directional receiver (where no beamforming is used), or 2) a beam-formed receiver (where beamforming weights are applied to the UD antenna), the monitored downlink control channels of the different APs should ideally satisfy certain example constraints as follows:

Omni-directional receiver: If multiple APs may transmit to the UD in the same slot, their monitored DL control channels of different APs must not overlap (to allow the UD to monitor the assigned DL control channels of each AP of the cluster set). Thus, for omni-directional receiver at UD, downlink control channels assigned to the APs of the cluster set should be non-overlapping.

Beam-formed receiver: the downlink (DL) control channels of different APs (of the cluster set), which are monitored by the UD, must not only be non-overlapping but also be separated in time by, at least, the beam-switching time (the time required by an UD to change its receiver antenna configuration from one AP to another) for the UD. For example, this additional time separation (beam-switching time) between DL control channels is to provide sufficient time to allow the UD receiver to change its antenna/beamforming configuration from a first set of beamforming weights applied at the UD receiver/antennas to receive a first DL control channel from a first AP of the cluster set to a second set of beamforming weights to receive a second DL control channel from a second AP. As noted, according to an example implementation, the downlink (DL) control channels transmitted by each AP may be sent via UD-specific beamforming.

Thus, according to an example implementation, the UD and the network elements (e.g., APs of the cluster set, CSM) may coordinate to determine the DL control channels of the APs (of the cluster set of APs for the UD) to be monitored by the UD for maintaining connectivity with multiple APs of the cluster set. The UD may determine the slot timing and DL control channel locations/DL control channel timing information of the APs which are accessible to it. The slot timing for an AP may be determined by detecting the synchronization channel of the AP. And, the downlink control channel timings for each AP may be determined by acquisition of the system information transmitted from the AP, for example. Each AP may include a group of downlink control channels, e.g., DC0, DC1, DC2, etc. For example, a downlink control channel timing (or DL control channel location, e.g., location of first DL control channel or location of DL control region) of an AP may be determined, in an illustrative example, by a UD as a specific or known time offset for the first DL control channel, e.g., time or location of a first symbol of DC0, for example. According to an example implementation, DL control channel timing may be determined, for example, by determining the slot timing/location, e.g., based on synchronization information received from the AP. Then, for example, the UD may determine DL control channel timing/location as a fixed or known time offset from the slot location, e.g., at the start of the slot, or 2 or 4 microseconds after a start of a slot, or other known location. As noted, in one illustrative example, a slot timing/location for an AP, may be determined by a UD based on synchronization signal detection, and also optionally in combination with system information received from an AP, or other information. System information may, for example, be used to obtain an offset for the slot timing from the synchronization channel timing. These are merely some example techniques for a UD to determine downlink control channel timing/location, and other techniques may be used.

After acquiring the DL control channel timing information for each of multiple APs, the UD sends a message to its CSM indicating the downlink control channel timing information of each AP. In addition, the UD may include in the message its receiver configuration type, e.g., indicating either omni-directional receiver or beam-formed receiver; if the receiver is beam-formed, it also includes the beam-switching time, which is the time required to configure the receiver antenna to switch for reception from one AP to another AP. The UD may send the message via its serving AP, which is the AP that is currently serving the UD, although the DL control channel timing may include timing/location information for many APs (both the serving AP, and other APs within range of the UD). According to an example implementation, upon receiving this information, the CSM may select (e.g., based on received signal strength or other criteria) a plurality of APs to be a cluster set of APs. According to an example implementation, the RSSI or other channel quality information, as measured by the UD, for each of the APs within range of the UD, may be forwarded to the CSM, for example, from the serving AP or the network, as examples. The CSM may also determine or select the DL control channels of the APs of the cluster set (the DL control channel for each AP) to be monitored by the UD (or used by the UD for communication with each AP in the cluster set) which satisfy the non-overlapping and separation constraints as described above, e.g., depending on the UD receiver type.

After the DL control channel allocations (DL control channel assignments for the UD, for the APs of the cluster set) are determined, the CSM may send the DL control channel allocations to the UD. On receiving the allocation, the UD begins monitoring the allocated DL control channels of multiple APs. The CSM notifies the DL control channel to be used by an AP for communication with the UD.

Alternatively, or in another example implementation, instead of the CSM selecting APs of the cluster set and determining/selecting DL control channels for each AP (DL control channel allocations), the UD may select a set of APs for its cluster set, and/or may determine a DL control channel, to be used by the UD, for each AP of the cluster set, and then may notify each AP of the cluster set and/or the CSM of the assignment or selection of downlink control channels for each AP of the cluster set.

According to an example implementation, a UD may receive downlink control channels (at least non-overlapping DL control channels) of multiple APs in a same time slot, for example, so that low-latency performance targets can be achieved for various procedures such as rapid rerouting in the event of radio link blockages, fast uplink access and uplink data transfer, etc.

According to an example implementation, a technique may include one or more of the following operations, or even all of these operations, for example: The UD acquires the downlink control channel timing information for multiple accessible APs and sends this timing information to its Cluster Set manager (CSM).

1. The CSM determines an allocation of the DL control channels in the different APs in the cluster set for monitoring by the UD, based on the received information from the UD.
2. The CSM notifies the UD of the DL control channel allocations in different APs in the cluster set, and also notifies the APs in the cluster set of the DL control channels to be used for communicating with the UD.
3. Based on the received information from the CSM, the UD monitors the allocated DL control channels of different APs in its cluster set.

According to an illustrative example implementation, a downlink control channel allocation procedure (e.g., performed by either at the CSM or the UD) may work as follows. Assume the set of NAPs were detected to be accessible by the UD and need to be monitored is S={$AP_0$, $AP_1, \ldots, AP_{N-1}$}. $AP_i$ has $M_i$ downlink control channels, $D_{p,i}$, p=0, ..., and their relative starting times (in increasing order) are $T_{p,i}$, p=0, ..., $M_i$–1.

Let $D_{seq}$=($D_q$, q=0, 1, ..., M–1)) be the sequence of the downlink control channels of all APs in S in the increasing order of their starting times, where $$M = \sum_{i=0}^{N-1} M_i.$$

The relative starting time of downlink control channel $D_q$ is denoted by $T_q$, i.e., $T_q \geq T_{q-1}$.

The DL control channels allocated by the N APs for the UE is a subset of $D_{seq}$ where each DL control channel is denoted by $Q_r$, r=0, 1, ..., R and R is the total number of DL control channels allocated by the N APs. The relative starting time of $Q_r$ is denoted by $T_r$ which is increasingly ordered, i.e., $T_r \geq T_{r-1}$.

In this illustrative example implementation, the term 'allocation' has been used to imply designation of the channel for monitoring by the UD (e.g., the AP may be in the cluster set for the UD); the 'allocated' channel is not dedicated or reserved for the UD, but instead can be used by the AP to communicate with any UD, for example.

The allocation of the DL control channel $Q_r$ for the UD in the N APs, ($Q_r$, r=0, 1, ..., R), can be selected satisfying the following constraints, for example:

$T_r \geq T_{r-1} + T_D + T_{BSW}$, r=1, ..., R–1 where $T_D$=DL control channel duration and $T_{BSW}$=receiver beam switching time of UD.
  a. If the UD receiver is omni-directional and multiple APs may send DL control messages to the UD in the same slot, then $T_{BSW}$=0.
  b. If two adjacent DL control channels allocated to an UD belong to the same AP then also $T_{BSW}$=0.

At least one DL control channel is allocated from each AP in S.

According to an example implementation, CSM 310 (or alternatively UD 132) may determine downlink (DL) control channel allocations for the APs of the cluster set for UD 132, such that each downlink control channel is at least non-overlapping, and possibly also separated by a beam-switching time if a beamformed received is used by the UD. After the DL control channel allocations are determined, the CSM 310 sends the allocation to the UD 132. According to an example implementation, upon receiving the DL control channel allocation(s), the UD 132 begins monitoring the allocated DL control channels. The CSM 310 may notify each AP (of the cluster set) of the DL control channel to be used by the AP for communicating with the UD 132. This may be accomplished in two example ways/techniques:
  1. Pre-notification: After determining the downlink control channel allocation for all APs of the cluster set, the CSM notifies each individual AP of its DL control channel for communication with the UD.
  2. On-demand notification: After determining the downlink control channel allocation for all APs of the cluster set, the CSM notifies only the serving AP of its DL control channel to be used for communication with the UD; for the non-serving (standby) APs in the cluster set, the CSM may send the notification of an assigned DL control channel to a standby AP when required (e.g., when the standby AP will be used for communicating with the UD), for example, during rapid rerouting when the CSM requests the standby AP to send handover request to the UD, or when the CSM sends a command or other information to be forwarded to the UD via the standby AP. Also, for example, when the UD performs an uplink access to a non-serving AP (e.g., sends a resource request to the standby AP), UD should typically indicate the DL control channel to be used by the non-serving/standby AP to send uplink access responses.

Figure 5:
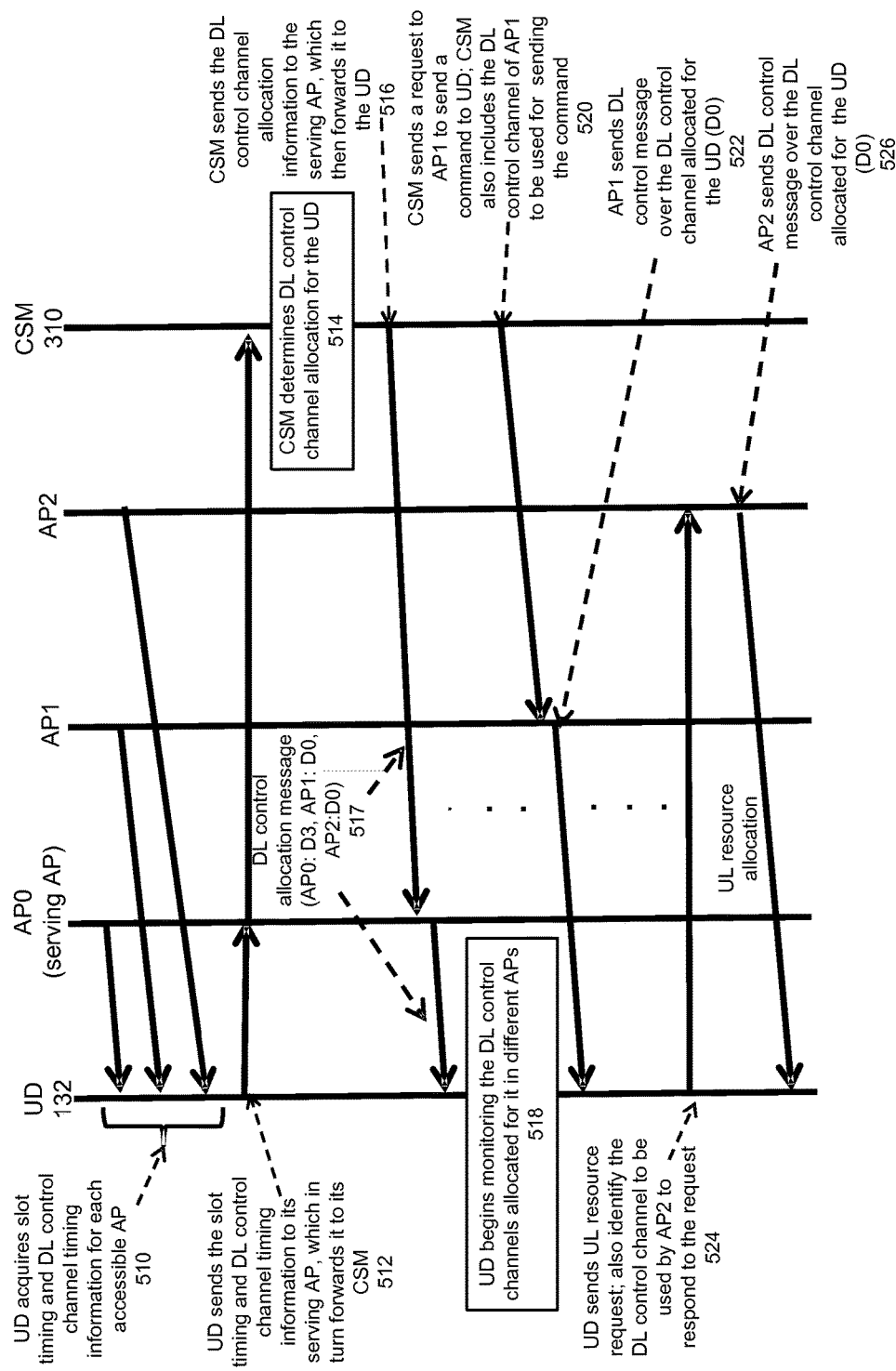
FIG. 5 is a diagram illustrating an example of a downlink control channel allocation in which a cluster set manager (CSM) determines the downlink control channel allocation(s), and where on-demand notification is provided to non-serving/standby APs according to an example implementation.

FIG. 5 is a diagram illustrating an example of a downlink control channel allocation in which a cluster set manager (CSM) determines the downlink control channel allocation(s), and where on-demand notification is provided to non-serving/standby APs according to an example implementation.

Referring to FIG. 5, a wireless network is shown that includes a user device (UD) 132, a cluster set manager 310, and a plurality of APs including AP0 that is a serving AP, and two non-serving/standby APs including AP1 and AP2. While AP1 and AP2 are referred to as non-serving/standby APs, in addition to communicating with and obtaining resources from serving AP (AP0), the UD 132 may also request resources from the non-serving/standby APs, and then may monitor its downlink control channel allocated to each of the APs for a resource allocation. Therefore, UD 132 may obtain uplink resources from and communicate with each (or all) of the APs of the cluster set. As a result, the UD 132 will typically need to determine a downlink control channel allocated for each AP for UD 132, and then monitor the allocated downlink control channel from each AP for messages directed/addressed to the UD 132, e.g., which may include a resource allocation from the AP to UD 132.

At 510, UD 132 receives synchronization signals or other signals from each of the APs of the cluster set, and determines a slot timing and downlink control channel timing information for each available access AP. At this point in the flow of FIG. 5, the cluster set of APs may not have been determined yet, so the UD 132 may determine downlink control channel timing information for a number of APs that are nearby, for example. At 512, the UD 132 may send the downlink control channel timing information for each of the APs to its serving AP, AP0, which in turn forwards this downlink control channel timing information to the CSM 310.

At 514, the CSM 310 may determine (e.g., based on received signal strength or channel quality of signals received by UD 132 from each of the APs, or other criteria) a cluster set of APs for the UD 132, which may include, as an illustrative example, AP0 (serving AP), AP1 (standby AP) and AP2 (standby AP). Also at 514, CSM 310 determines the downlink control channel allocations for the UD 132 including a downlink control channel allocation for each AP of the cluster set. At 516, CSM 310 sends the downlink control channel allocation information to the serving AP, AP0 in this case, which then forwards this downlink control channel allocation information to the UD 132. For example, CSM 310 may send to the serving AP (AP0) a downlink control channel allocation message 517 that indicates the allocated downlink control channel for each AP of the cluster set, including: downlink control channel D3 assigned/allocated to AP0; downlink control channel D0 allocated to AP1; and downlink control channel D0 allocated to AP2. These allocated downlink control channels should be used, respectively, by each of the APs of the cluster set to communicate downlink control information (which may include a resource allocation) to the UD 132. At 518, UD 132 begins monitoring or receiving the downlink control channels allocated for the different APs of the cluster set to communicate with UD 132.

At 520, a situation may arise in which it may be desirable for CSM 310 to send a command or other information to one of the non-serving/standby APs (AP1 or AP2). For example, a blocked or interrupted wireless connection between the serving AP and UD 132 may cause a loss of wireless service for UD 132. The serving AP (AP0) may detect the loss of wireless service or a dropped wireless connection between UD 132 and serving AP (AP0), for example, if an acknowledgment (for data sent to the UD 132) is not received by AP0 within a timeout period. In such a case, the serving AP (e.g., AP0) may notify the CSM 310 of the interrupted wireless service or dropped wireless connection between serving AP and UD 132. Thus, at 520, CSM 310 may send a request to a standby AP (e.g., AP1) that includes: an indication of the downlink control channel allocated for AP1 to communicate with UD 132, and a command (or other information) to be forwarded to UD 132. In an illustrative example, the command may be a command to UD 132 to perform a handover to one of the standby APs, for example.

At 522, AP1 may send a downlink control message over the downlink control channel allocated for AP1 to communicate with UD 132, e.g., over downlink control channel D0. The downlink control message may include a command to UD 132 to perform a handover to the standby AP, AP1. This is merely an illustrative example implementation, and other information or commands may be forwarded from a standby AP to the UD 132, e.g., in the event of a failure or service interruption with the UD-serving AP connection.

According to an example implementation, for fast uplink access for the UD 132, instead of waiting for the next uplink access opportunity (which may be a RACH slot or an uplink polling channel) of its serving AP, it may utilize the uplink access opportunity of a stand-by AP in its cluster set which appears earlier. Thus, at 524, UD 132 may send an uplink resource request to a standby AP, such as AP2, requesting uplink resources for transmission of data to the standby AP (e.g., AP2), for example. The uplink resource request sent by UD 132 to AP2 at 524 may identify the downlink control channel (e.g., D0) to be used by AP2 to respond to the request via the downlink control channel (which is the downlink control channel that has been allocated to AP2 for sending downlink control signals to the UD 132). Note that the message at 520 from the CSM 310 to AP1, and the message at 524 from UD 132 to AP2, are examples of on-demand notifications (e.g., to standby APs of a cluster set) of the downlink control channels that have been allocated for these APs to communicate with UD 132. Thus, according to an example implementation, on-demand notification (of DL control channel allocation) may include notifying a standby AP of the downlink control channel allocated to the AP for communication with UD 132, where the notification may be performed in response to a need or demand for DL communication from the standby AP to the UD 132, and/or such DL control channel notification may be provided at the time there is a need or demand for the standby AP to communicate with UD 132 via its allocated downlink control channel. At 526, AP2 sends a downlink control message to UD 132 over the downlink control channel (e.g., D0) allocated to AP 2 for the UD 132, e.g., providing an uplink resource grant from AP2 to UD 132.

Figure 6:
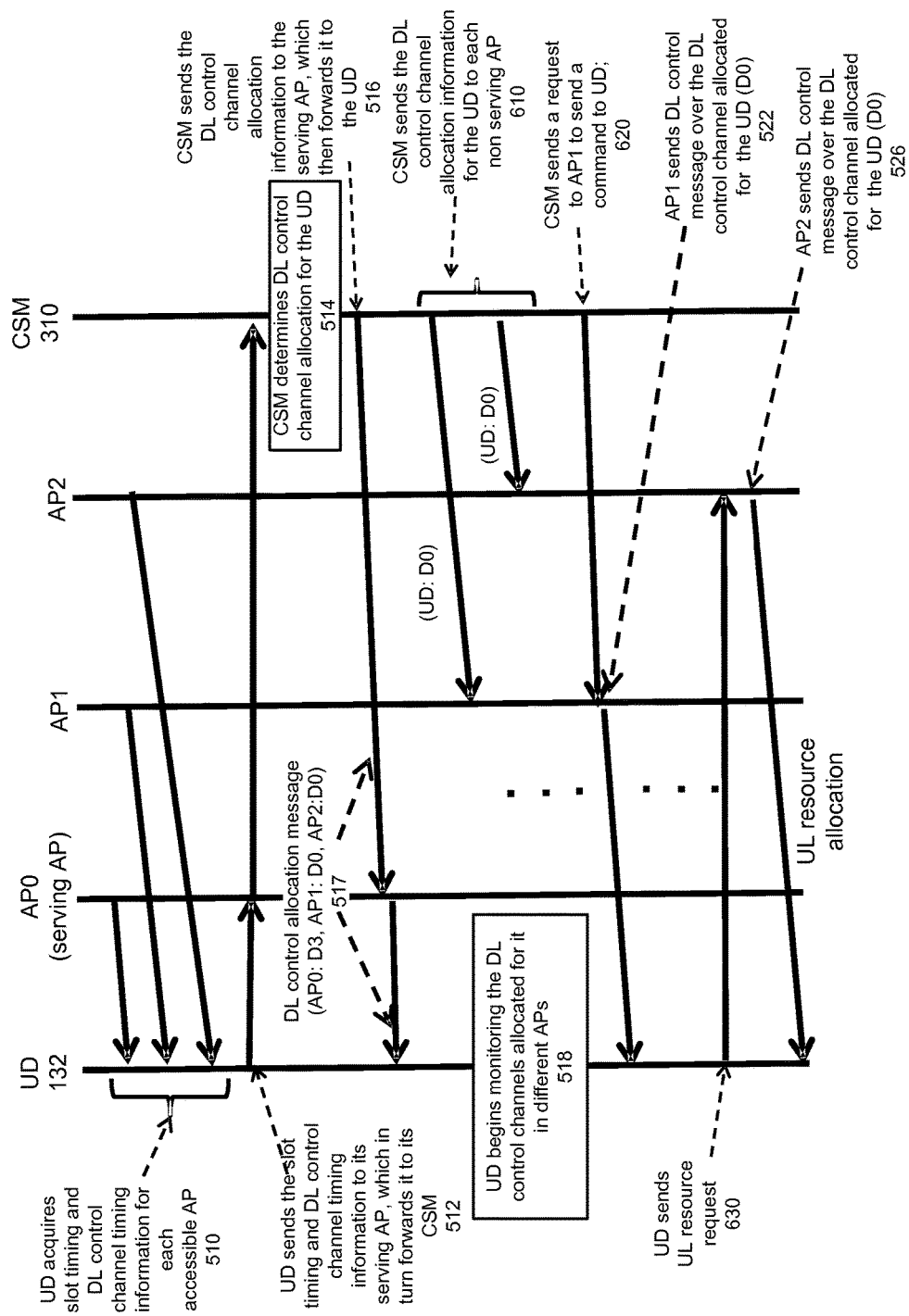
FIG. 6 is a diagram illustrating an example of a downlink control channel allocation in which a cluster set manager (CSM) determines the downlink control channel allocation(s), and where a pre-notification is provided to non-serving/standby APs according to an example implementation.

FIG. 6 is a diagram illustrating an example of a downlink control channel allocation in which a cluster set manager (CSM) determines the downlink control channel allocation(s), and where a pre-notification is provided to non-serving/standby APs according to an example implementation. The diagram illustrated in FIG. 6 is very similar to the diagram of FIG. 5. However, in FIG. 6, the CSM 310 pre-notifies one or more non-serving/standby APs of the downlink control channel allocated to the AP for UD 132. For example, a pre-notification may include sending a DL control channel notification to non-serving/standby APs before there is a need for the non-serving/standby APs to send downlink signals to the UD 132. Non-serving/standby APs in this illustrative example may include AP1 and AP2. Therefore, according to an example implementation, at 610, CSM 310 may send a message to AP1 identifying the downlink control channel (e.g., D0) that has been allocated to AP1 for communicating with UD 132. CSM 310 may also send a message to AP2 identifying the downlink control channel (e.g., D0) that has been allocated to AP2 for communicating with UD 132. At 620, CS 310 sends a request to AP1 to send a command to UD 132. However, according to an example implementation, unlike the operation at 520 (FIG. 5), the request sent at 620 does not include (or at least does not need to include) the downlink control channel allocated to AP1, since AP1 was pre-notified at 610 of the downlink control channel allocated to AP1 for UD 132. Similarly, at 630, the UD 132 may send an uplink resource request to AP2. However, the request sent at 630 does not necessarily need to include the downlink control channel allocated to AP2 for UD 132, since AP2 was (previously) pre-notified of its downlink control channel allocation at 610. As shown in FIG. 6, the other operations are the same or very similar to the operations of FIG. 5.

Figure 7:
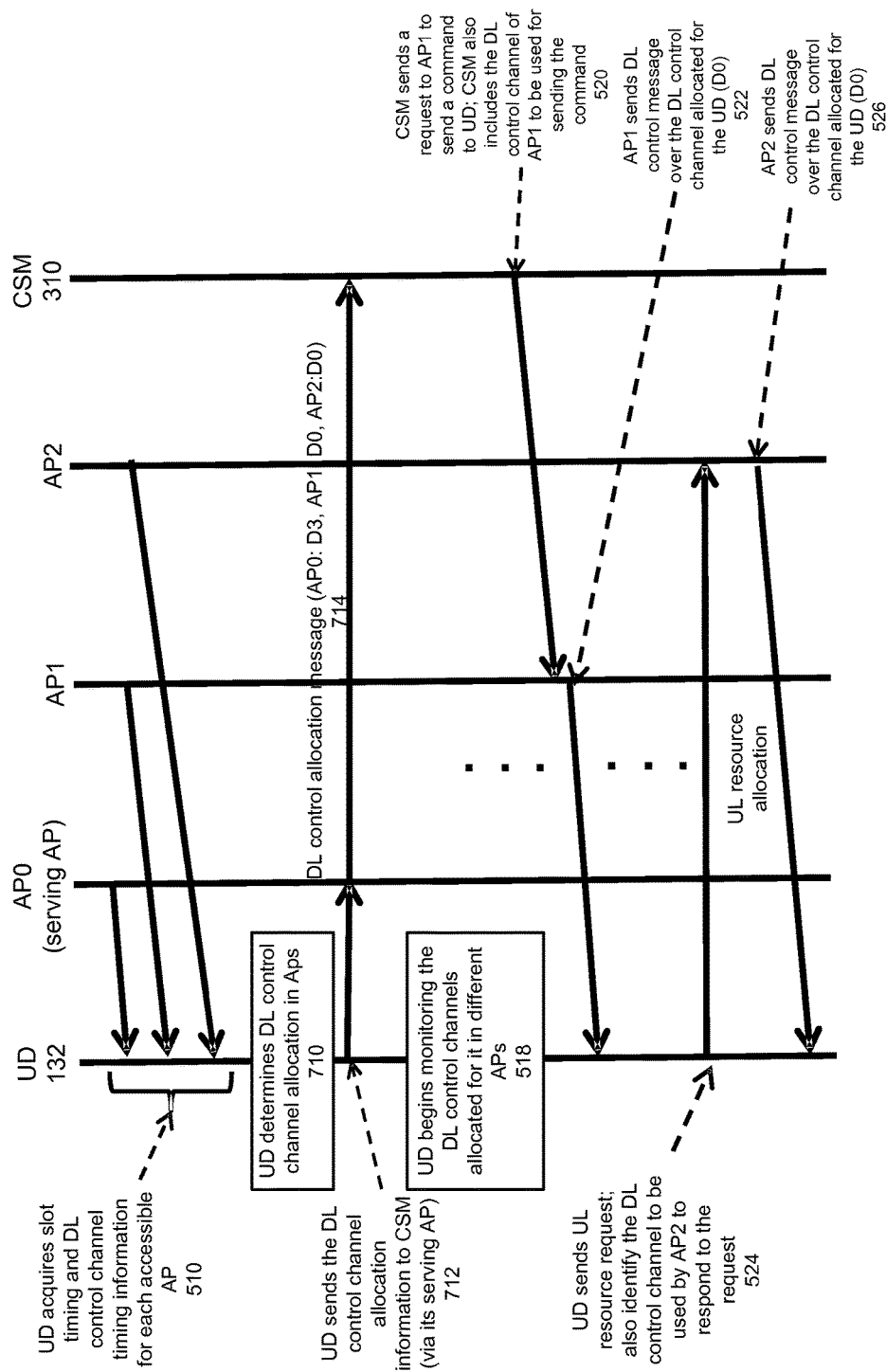
FIG. 7 is a diagram illustrating an example of a downlink control channel allocation in which a user device (UD) determines the downlink control channel allocation(s) and where on-demand notification is provided to non-serving/standby APs according to an example implementation.

FIG. 7 is a diagram illustrating an example of a downlink control channel allocation in which a user device (UD) determines the downlink control channel allocation(s) and where on-demand notification is provided to non-serving/standby APs according to an example implementation. The diagram of FIG. 7 is very similar to the diagram of FIG. 5, with the following differences: At 710, the UD 132 may determine a cluster set of APs (e.g., based on received signal strength or other channel quality for each AP, and may select the three APs providing the highest received signal strength or best channel quality to UD 132, or other technique), and may determine the downlink control channel allocations for the cluster set of APs for UD 132. At 712, UD 132 may send a downlink control channel allocation message 714 to the CSM 310 via its serving AP (AP0 in this example), notifying the CSM 310 of: 1) the cluster set of APs for the UD 132, and/or 2) the downlink control channel allocations for each of the APs of the cluster set, e.g., D3 allocated to AP0, D0 allocated to AP1, and D0 allocated to AP2, for example. The non-serving/standby APs may then be notified, on demand, by either the CSM 310 or the UD 132, which is the same as (or very similar to) the operation shown in FIG. 5. The other operations in FIG. 7 are the same or very similar to the operations of FIG. 5, as shown by the numerals in FIG. 7.

Figure 8:
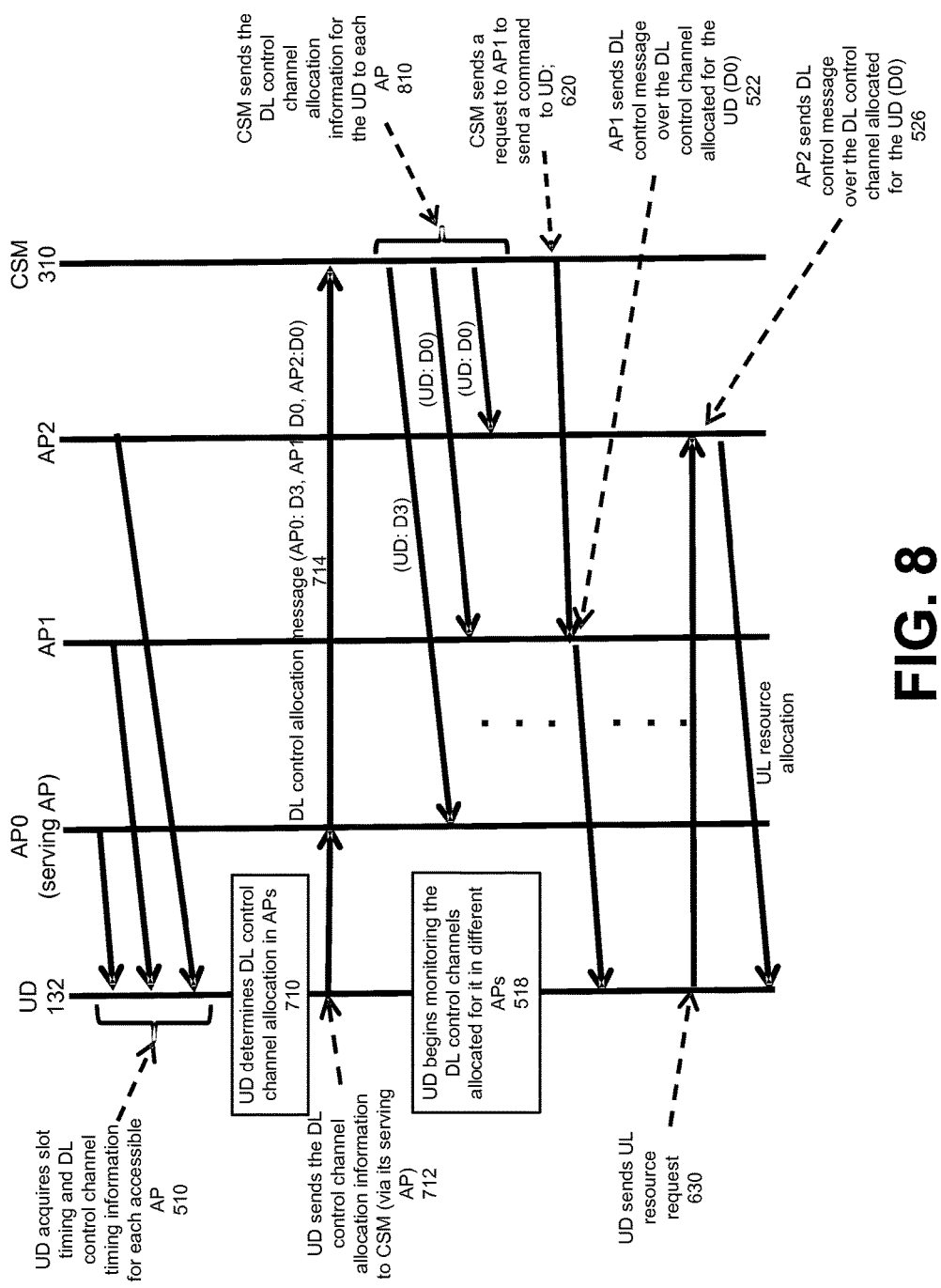
FIG. 8 is a diagram illustrating an example of a downlink control channel allocation in which a user device (UD) determines the downlink control channel allocation(s) and where a pre-notification is provided to non-serving/standby APs according to an example implementation.

FIG. 8 is a diagram illustrating an example of a downlink control channel allocation in which a user device (UD) determines the downlink control channel allocation(s) and where a pre-notification is provided to non-serving/standby APs according to an example implementation. As shown in FIG. 8, the UD determines the cluster set of APs, and determines the downlink channel allocations (e.g., the same as operation 710, FIG. 7), and then notifies the CSM 310 of the downlink control channel notifications (e.g., the same as operation 712, FIG. 7). At 810, CSM 310 may send a pre-notification to each of the APs to provide the downlink control channel information to each AP of the cluster set, including a message sent to AP0 (indicating channel D3), a message sent to AP1 (indicating channel D0) and a message sent to AP2 (indicating channel D0). The other operations in FIG. 8 are the same or similar to those operations in FIG. 5, 6, or 7, as shown by the numerals used in FIG. 8.

Figure 9:
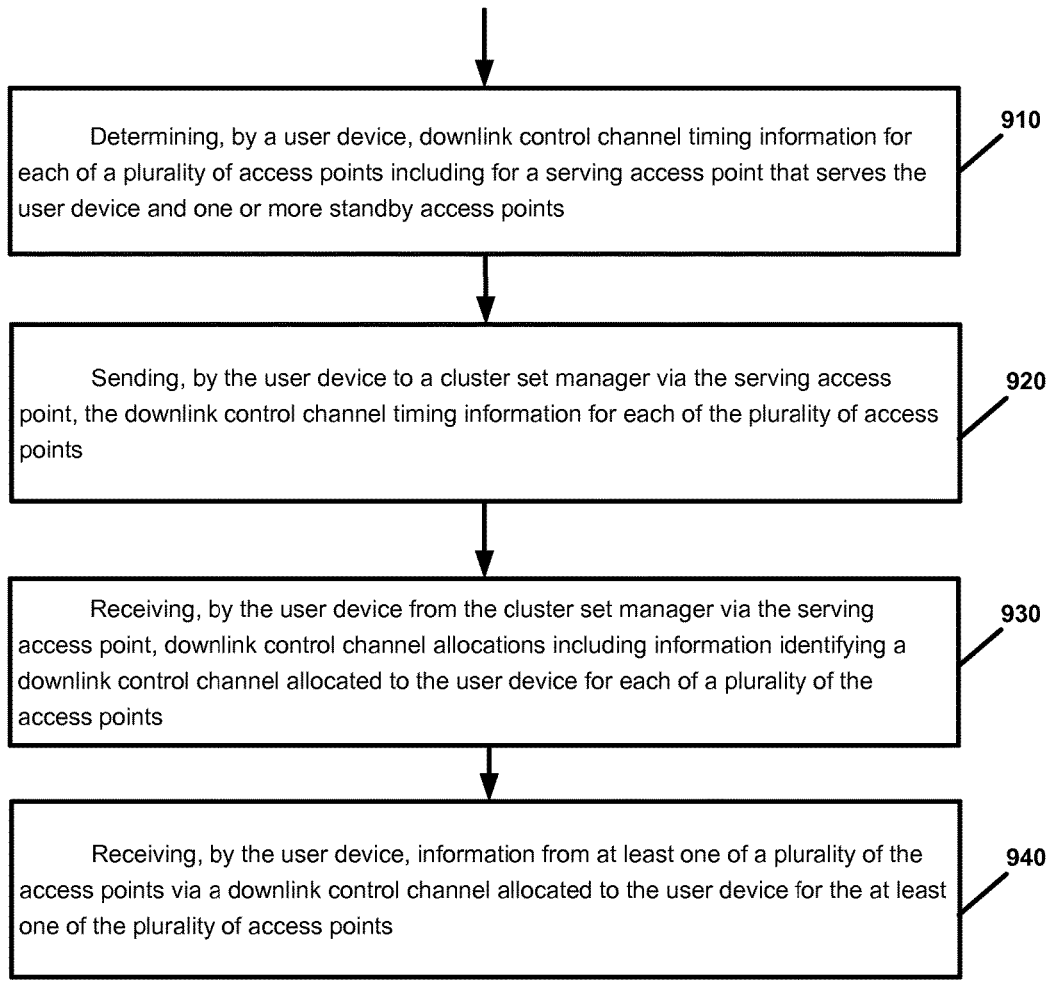
FIG. 9 is a flow chart illustrating operation of a user device according to an example implementation.

FIG. 9 is a flow chart illustrating operation of a user device according to an example implementation. In FIG. 9, A method is described for communicating with a plurality of access points. Operation 910 includes determining, by a user device, downlink control channel timing information for each of a plurality of access points including for a serving access point that serves the user device and one or more standby access points. Operation 920 includes sending, by the user device to a cluster set manager via the serving access point, the downlink control channel timing information for each of the plurality of access points. Operation 930 includes receiving, by the user device from the cluster set manager via the serving access point, downlink control channel allocations including information identifying a downlink control channel allocated to the user device for each of a plurality of the access points. And, operation 940 includes receiving, by the user device, information from at least one of a plurality of the access points via a downlink control channel allocated to the user device for the at least one of the plurality of access points.

According to an example implementation of the method of FIG. 9, the sending may include sending, by the user device to a cluster set manager via the serving access point, the downlink control channel timing information for each of the plurality of access points, a receiver configuration type for the user device indicating either omnidirectional receiver or beam-formed receiver.

According to an example implementation of the method of FIG. 9, the sending may further include the following if the receiver configuration type is a beam-formed receiver: sending, by the user device to a cluster set manager via the serving access point, a beam-switching time for the receiver of the user device.

According to an example implementation of the method of FIG. 9, the downlink control channel allocations may include a downlink control channel allocated to the user device for each of a plurality of the access points that do not overlap in time.

According to an example implementation of the method of FIG. 9, the downlink control channel allocations may include a downlink control channel allocated to the user device for each of a plurality of the access points that are separated in time by at least a beam-switching time of the user device.

According to an example implementation of the method of FIG. 9, the method may further include receiving, by the user device from each of the plurality of access points via a plurality of beams, synchronization signals; determining, by the user device based on the received beams, a best beam for each of the plurality of access points; and, sending, by the user device to at least one of the plurality of access points, a message indicating the best beam for the at least one of the plurality of access points.

According to an example implementation of the method of FIG. 9, the method may further include sending, by the user device to the cluster set manager, a message indicating the best beam for the at least one of the plurality of access points.

According to an example implementation of the method of FIG. 9, the method may further include sending, by the user device to a first standby access point of the one or more standby access points, an uplink resource request and an indication of the downlink control channel allocated to the user device for the first standby access point; receiving, by the user device from the first standby access point, an uplink resource allocation via the downlink control channel allocated to the user device for the first standby access point.

According to an example implementation of the method of FIG. 9, the method may further include sending, by the user device to a first standby access point of the one or more standby access points, an uplink resource request, wherein the first standby access point was previously notified by the cluster set manager of the downlink control channel allocated to the user device for the first standby access point; and receiving, by the user device from the first standby access point, an uplink resource allocation via the downlink control channel allocated to the user device for the first standby access point.

According to an example implementation of the method of FIG. 9, the receiving, by the user device from the cluster set manager via the serving access point, downlink control channel allocations including a downlink control channel allocated to the user device for each of a plurality of the access points may include: receiving, by the user device from the cluster set manager via the serving access point: a first downlink control channel allocated to the user for the serving access point; and a second downlink control channel allocated to the user for a first standby access point, wherein the first downlink control channel and the second downlink control channel are non-overlapping in time.

According to an example implementation, an apparatus may include at least one processor and at least one memory including computer instructions, when executed by the at least one processor, cause the apparatus to: determine, by a user device, downlink control channel timing information for each of a plurality of access points including for a serving access point that serves the user device and one or more standby access points; send, by the user device to a cluster set manager via the serving access point, the downlink control channel timing information for each of the plurality of access points; receive, by the user device from the cluster set manager via the serving access point, downlink control channel allocations including information identifying a downlink control channel allocated to the user device for each of a plurality of the access points; and receive, by the user device, information from at least one of a plurality of the access points via a downlink control channel allocated to the user device for the at least one of the plurality of access points.

Figure 12:
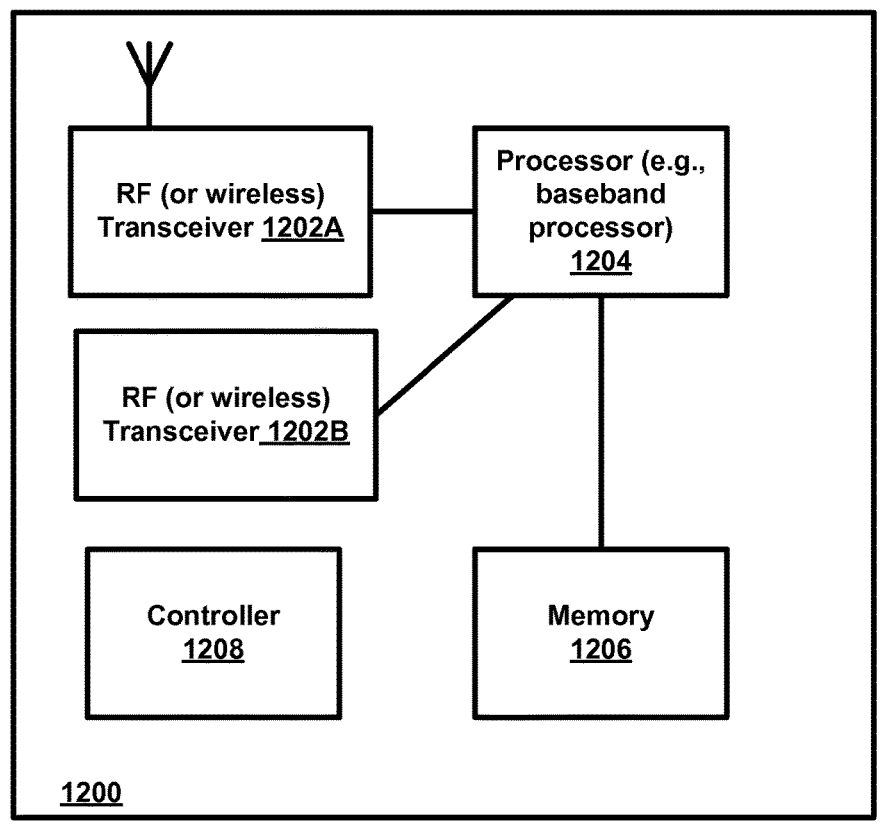
FIG. 12 is a block diagram of a wireless station (e.g., base station or mobile station) according to an example implementation.

According to an example implementation an apparatus may include means (e.g., 1202A/1202B and/or 1204, FIG. 12) for determining, by a user device, downlink control channel timing information for each of a plurality of access points including for a serving access point that serves the user device and one or more standby access points, means (e.g., 1202A/1202B and/or 1204, FIG. 12) for sending, by the user device to a cluster set manager via the serving access point, the downlink control channel timing information for each of the plurality of access points, means (e.g., 1202A/1202B and/or 1204, FIG. 12) for receiving, by the user device from the cluster set manager via the serving access point, downlink control channel allocations including information identifying a downlink control channel allocated to the user device for each of a plurality of the access points, and means (e.g., 1202A/1202B and/or 1204, FIG. 12)

for receiving, by the user device, information from at least one of a plurality of the access points via a downlink control channel allocated to the user device for the at least one of the plurality of access points.

According to an example implementation, the means for sending may include means (e.g., 1202A/1202B and/or 1204, FIG. 12) for sending, by the user device to a cluster set manager via the serving access point, the downlink control channel timing information for each of the plurality of access points, a receiver configuration type for the user device indicating either omnidirectional receiver or beamformed receiver.

According to an example implementation, the means for sending may further include the following if the receiver configuration type is a beam-formed receiver: means (e.g., 1202A/1202B and/or 1204, FIG. 12) for sending, by the user device to a cluster set manager via the serving access point, a beam-switching time for the receiver of the user device.

According to an example implementation, the downlink control channel allocations may include a downlink control channel allocated to the user device for each of a plurality of the access points that do not overlap in time.

According to an example implementation, the downlink control channel allocations may include a downlink control channel allocated to the user device for each of a plurality of the access points that are separated in time by at least a beam-switching time of the user device.

According to an example implementation, the apparatus may further include means (e.g., 1202A/1202B and/or 1204, FIG. 12) for receiving, by the user device from each of the plurality of access points via a plurality of beams, synchronization signals; means (e.g., 1202A/1202B and/or 1204, FIG. 12) for determining, by the user device based on the received beams, a best beam for each of the plurality of access points; and, means (e.g., 1202A/1202B and/or 1204, FIG. 12) for sending, by the user device to at least one of the plurality of access points, a message indicating the best beam for the at least one of the plurality of access points.

According to an example implementation, the apparatus may further include means (e.g., 1202A/1202B and/or 1204, FIG. 12) for sending, by the user device to the cluster set manager, a message indicating the best beam for the at least one of the plurality of access points.

According to an example implementation, the apparatus may further include means (e.g., 1202A/1202B and/or 1204, FIG. 12) for sending, by the user device to a first standby access point of the one or more standby access points, an uplink resource request and an indication of the downlink control channel allocated to the user device for the first standby access point; and means (e.g., 1202A/1202B and/or 1204, FIG. 12) for receiving, by the user device from the first standby access point, an uplink resource allocation via the downlink control channel allocated to the user device for the first standby access point.

According to an example implementation, the apparatus may further include means (e.g., 1202A/1202B and/or 1204, FIG. 12) for sending, by the user device to a first standby access point of the one or more standby access points, an uplink resource request, wherein the first standby access point was previously notified by the cluster set manager of the downlink control channel allocated to the user device for the first standby access point; and means (e.g., 1202A/1202B and/or 1204, FIG. 12) for receiving, by the user device from the first standby access point, an uplink resource allocation via the downlink control channel allocated to the user device for the first standby access point.

According to an example implementation, the means for receiving, by the user device from the cluster set manager via the serving access point, downlink control channel allocations including a downlink control channel allocated to the user device for each of a plurality of the access points may include: means (e.g., 1202A/1202B and/or 1204, FIG. 12) for receiving, by the user device from the cluster set manager via the serving access point: a first downlink control channel allocated to the user for the serving access point; and a second downlink control channel allocated to the user for a first standby access point, wherein the first downlink control channel and the second downlink control channel are non-overlapping in time.

Figure 10:
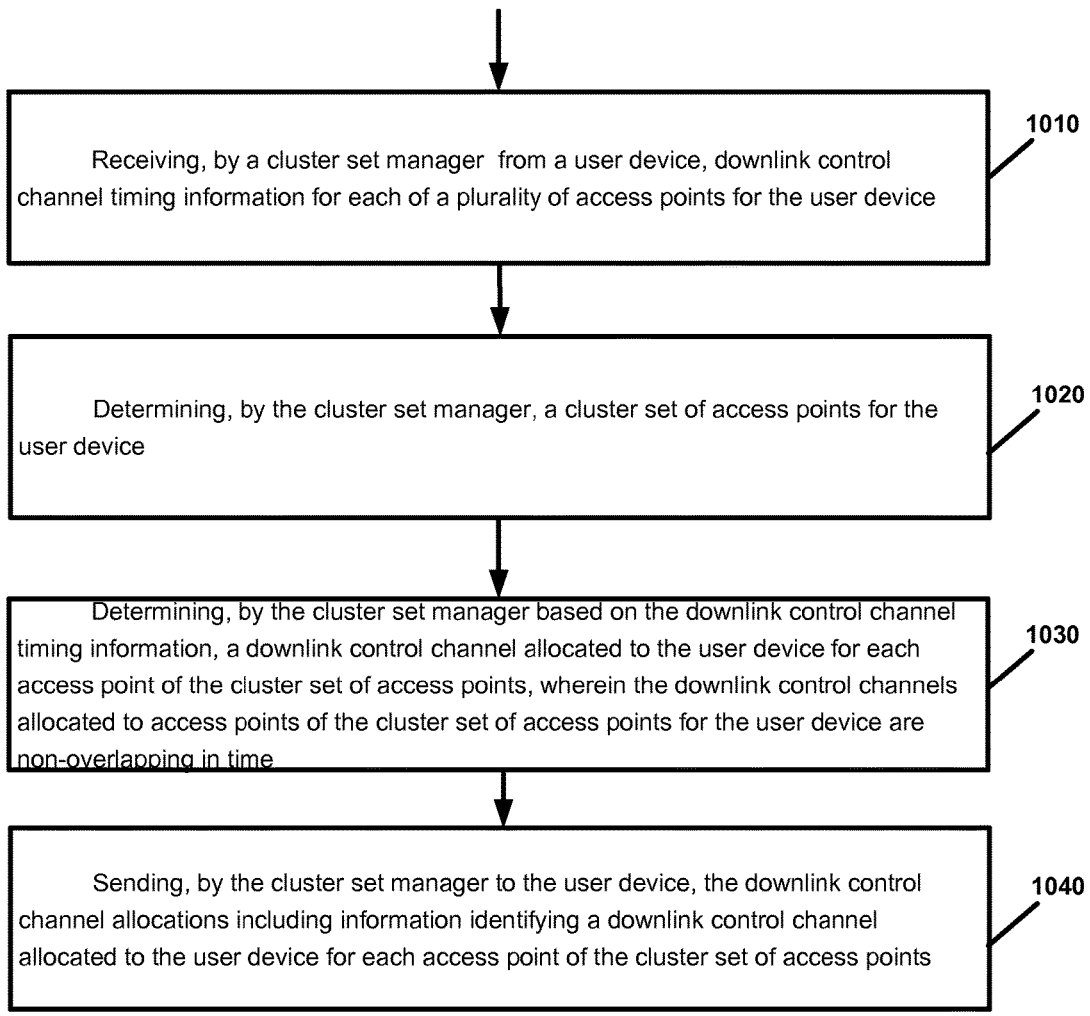
FIG. 10 is a flow chart illustrating operation of a cluster set manager according to an example implementation.

FIG. 10 is a flow chart illustrating operation of a cluster set manager according to an example implementation. Operation 1010 includes receiving, by a cluster set manager from a user device, downlink control channel timing information for each of a plurality of access points for the user device. Operation 1020 includes determining, by the cluster set manager, a cluster set of access points for the user device. Operation 1030 includes determining, by the cluster set manager based on the downlink control channel timing information, a downlink control channel allocated to the user device for each access point of the cluster set of access points, wherein the downlink control channels allocated to access points of the cluster set of access points for the user device are non-overlapping in time. And, operation 1040 includes sending, by the cluster set manager to the user device, the downlink control channel allocations including information identifying a downlink control channel allocated to the user device for each access point of the cluster set of access points.

According to an example implementation, based on the received DL control channel timing information from the UD, the CSM may send a request to each of the APs to allocate a DL control channel in their data slot structure that will satisfy the timing constraints. For example, allowing each AP (rather than the CSM or UD) to allocate a DL control channel for the UD based on the control channel timing information and/or timing constraints may be useful, as an example, for load balancing, because multiple users/UDs may be assigned to a same DL control channel and the CSM may not have the up-to-date load information at the APs. Each AP, after allocating a DL control channel for the UD, may then send a message to notify the CSM of the DL control channel allocated to the UD.

Therefore, according to an example implementation of the method of FIG. 10, the determining, by the cluster set manager based on the downlink control channel timing information, a downlink control channel allocated to the user device for each access point of the cluster set of access points may include: determining, by the cluster set manager based on the downlink control channel timing information and a beam-switching time for the user device, a location constraint for allocation of a downlink control channel in the slot of an access point of the cluster set, and sending, by the cluster set manager to the access point, a request for an allocation by the access point of a downlink control channel for the user device satisfying the location constraint; and; receiving, by the cluster set manager from the access point, an allocation by the access point of a downlink control channel for the user device.

According to an example implementation of the method of FIG. 10, the receiving may further include receiving, by the cluster set manager from the user device, a receiver configuration type for the user device indicating either omnidirectional receiver or beam-formed receiver.

According to an example implementation of the method of FIG. 10, the receiving may further include receiving, by the cluster set manager from the user device: a receiver configuration type for the user device indicating a beam-formed receiver for the user device; and a beam-switching time for the receiver of the user device.

According to an example implementation of the method of FIG. 10, the determining, by the cluster set manager based on the downlink control channel timing information, a downlink control channel allocated to the user device for each access point of the cluster set of access points may include: determining, by the cluster set manager based on the downlink control channel timing information and the beam-switching time, a downlink control channel allocated to the user device for each access point of the cluster set of access points, wherein the downlink control channels allocated to access points of the cluster set of access points for the user device are separated by at least the beam-switching time.

According to an example implementation of the method of FIG. 10, the method may further include sending, by the cluster set manager to each of the access points of the cluster set for the user device, information identifying the downlink control channel allocated to the user device for a corresponding access point of the cluster set of access points.

According to an example implementation of the method of FIG. 10, the sending, by the cluster set manager to each of the access points of the cluster set for the user device, the downlink control channel allocated to the user device for a corresponding access point of the cluster set of access points may include: sending, by the cluster set manager to a first access point of the cluster set of access points, information identifying a first downlink control channel allocated to the user device for the first access point; and sending, by the cluster set manager to a second access point of the cluster set of access points, information identifying a second downlink control channel allocated to the user device for the second access point, wherein the first downlink control channel and the second downlink control channel are separated by at least a beam-switching time for the user device.

According to an example implementation of the method of FIG. 10, the cluster set manager is a cluster set manager configured to manage the plurality of access points of the cluster set for the user device.

According to an example implementation an apparatus may include at least one processor and at least one memory including computer instructions, when executed by the at least one processor, cause the apparatus to: receive, by a cluster set manager from a user device, downlink control channel timing information for each of a plurality of access points for the user device; determine, by the cluster set manager, a cluster set of access points for the user device; determine, by the cluster set manager based on the downlink control channel timing information, a downlink control channel allocated to the user device for each access point of the cluster set of access points, wherein the downlink control channels allocated to access points of the cluster set of access points for the user device are non-overlapping in time; and send, by the cluster set manager to the user device, the downlink control channel allocations including information identifying a downlink control channel allocated to the user device for each access point of the cluster set of access points.

According to an example implementation, an apparatus may include means (e.g., 1202A/1202B and/or 1204, FIG. 12) for receiving, by a cluster set manager from a user device, downlink control channel timing information for each of a plurality of access points for the user device, means (e.g., 1202A/1202B and/or 1204, FIG. 12) for determining, by the cluster set manager, a cluster set of access points for the user device, means (e.g., 1202A/1202B and/or 1204, FIG. 12) for determining, by the cluster set manager based on the downlink control channel timing information, a downlink control channel allocated to the user device for each access point of the cluster set of access points, wherein the downlink control channels allocated to access points of the cluster set of access points for the user device are non-overlapping in time, and means (e.g., 1202A/1202B and/or 1204, FIG. 12) for sending, by the cluster set manager to the user device, the downlink control channel allocations including information identifying a downlink control channel allocated to the user device for each access point of the cluster set of access points.

According to an example implementation, the means for determining, by the cluster set manager based on the downlink control channel timing information, a downlink control channel allocated to the user device for each access point of the cluster set of access points may include: means (e.g., 1202A/1202B and/or 1204, FIG. 12) for determining, by the cluster set manager based on the downlink control channel timing information and a beam-switching time for the user device, a location constraint for allocation of a downlink control channel in the slot of an access point of the cluster set, means (e.g., 1202A/1202B and/or 1204, FIG. 12) for sending, by the cluster set manager to the access point, a request for an allocation by the access point of a downlink control channel for the user device satisfying the location constrain, and means (e.g., 1202A/1202B and/or 1204, FIG. 12) for receiving, by the cluster set manager from the access point, an allocation by the access point of a downlink control channel for the user device.

According to an example implementation, the means for receiving may further include means (e.g., 1202A/1202B and/or 1204, FIG. 12) for receiving, by the cluster set manager from the user device, a receiver configuration type for the user device indicating either omnidirectional receiver or beam-formed receiver.

According to an example implementation, the means for receiving may further include means (e.g., 1202A/1202B and/or 1204, FIG. 12) for receiving, by the cluster set manager from the user device: a receiver configuration type for the user device indicating a beam-formed receiver for the user device; and a beam-switching time for the receiver of the user device.

According to an example implementation, the means for determining, by the cluster set manager based on the downlink control channel timing information, a downlink control channel allocated to the user device for each access point of the cluster set of access points may include: means (e.g., 1202A/1202B and/or 1204, FIG. 12) for determining, by the cluster set manager based on the downlink control channel timing information and the beam-switching time, a downlink control channel allocated to the user device for each access point of the cluster set of access points, wherein the downlink control channels allocated to access points of the cluster set of access points for the user device are separated by at least the beam-switching time.

According to an example implementation, the apparatus may further include means (e.g., 1202A/1202B and/or 1204, FIG. 12) for sending, by the cluster set manager to each of the access points of the cluster set for the user device, information identifying the downlink control channel allocated to the user device for a corresponding access point of the cluster set of access points.

According to an example implementation, the means for sending, by the cluster set manager to each of the access points of the cluster set for the user device, the downlink control channel allocated to the user device for a corresponding access point of the cluster set of access points may include: means (e.g., 1202A/1202B and/or 1204, FIG. 12) for sending, by the cluster set manager to a first access point of the cluster set of access points, information identifying a first downlink control channel allocated to the user device for the first access point; and means (e.g., 1202A/1202B and/or 1204, FIG. 12) for sending, by the cluster set manager to a second access point of the cluster set of access points, information identifying a second downlink control channel allocated to the user device for the second access point, wherein the first downlink control channel and the second downlink control channel are separated by at least a beam-switching time for the user device.

According to an example implementation, the cluster set manager may be a cluster set manager configured to manage the plurality of access points of the cluster set for the user device.

Figure 11:
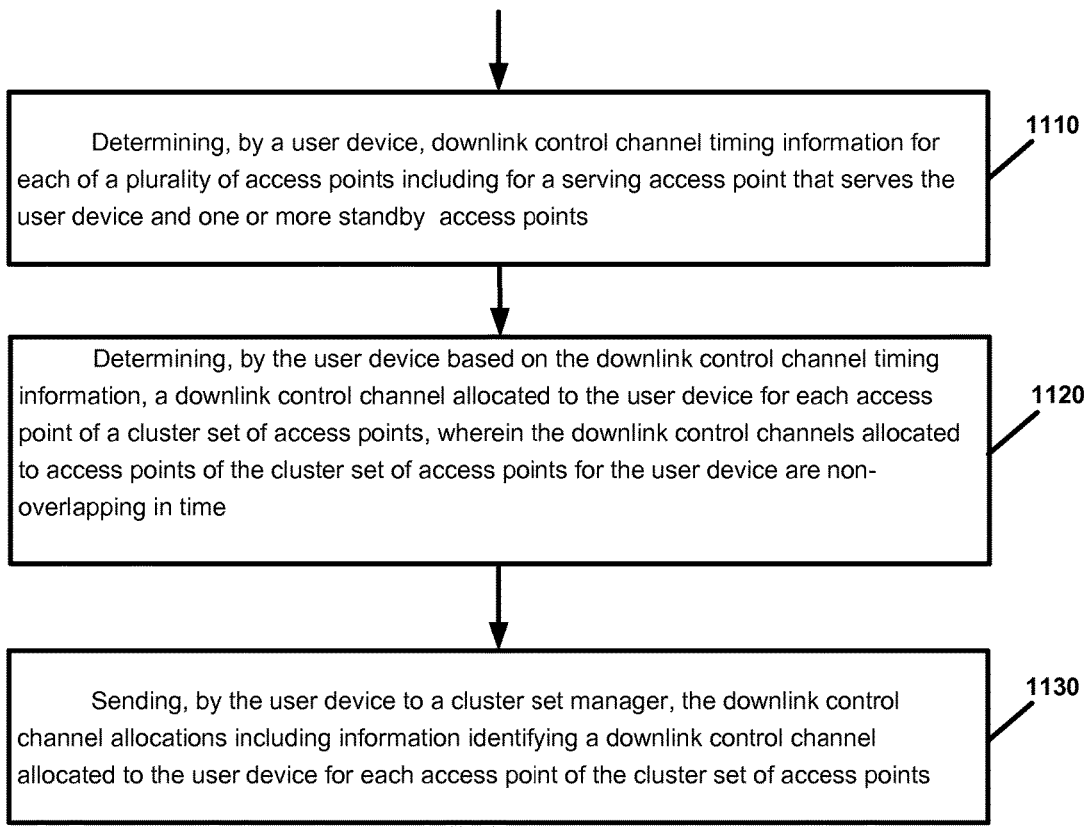
FIG. 11 is a flow chart illustrating operation of a user device according to an example implementation.

FIG. 11 is a flow chart illustrating operation of a user device according to an example implementation. Operation 1110 includes determining, by a user device, downlink control channel timing information for each of a plurality of access points including for a serving access point that serves the user device and one or more standby access points. Operation 1120 includes determining, by the user device based on the downlink control channel timing information, a downlink control channel allocated to the user device for each access point of a cluster set of access points, wherein the downlink control channels allocated to access points of the cluster set of access points for the user device are non-overlapping in time. And, operation 1130 includes sending, by the user device to a cluster set manager, the downlink control channel allocations including information identifying a downlink control channel allocated to the user device for each access point of the cluster set of access points.

According to an example implementation of the method of FIG. 11, the method may further include receiving, by the user device, information from at least one of the access points of the cluster set of access points via a downlink control channel allocated to the user device for the at least one of the access points.

According to an example implementation of the method of FIG. 11, the determining may include determining, by the user device based on the downlink control channel timing information and a beam-switching time for the user device, a downlink control channel allocated to the user device for each access point of a cluster set of access points, wherein the downlink control channels allocated to access points of the cluster set of access points for the user device are separated by at least the beam-switching time for the user device.

According to an example implementation, an apparatus may include at least one processor and at least one memory including computer instructions, when executed by the at least one processor, cause the apparatus to: determine, by a user device, downlink control channel timing information for each of a plurality of access points including for a serving access point that serves the user device and one or more standby access points; determine, by the user device based on the downlink control channel timing information, a downlink control channel allocated to the user device for each access point of a cluster set of access points, wherein the downlink control channels allocated to access points of the cluster set of access points for the user device are non-overlapping in time; and send, by the user device to a cluster set manager, the downlink control channel allocations including information identifying a downlink control channel allocated to the user device for each access point of the cluster set of access points.

According to an example implementation, an apparatus may include means (e.g., 1202A/1202B and/or 1204, FIG. 12) for determining, by a user device, downlink control channel timing information for each of a plurality of access points including for a serving access point that serves the user device and one or more standby access points, means (e.g., 1202A/1202B and/or 1204, FIG. 12) for determining, by the user device based on the downlink control channel timing information, a downlink control channel allocated to the user device for each access point of a cluster set of access points, wherein the downlink control channels allocated to access points of the cluster set of access points for the user device are non-overlapping in time, and means (e.g., 1202A/1202B and/or 1204, FIG. 12) for sending, by the user device to a cluster set manager, the downlink control channel allocations including information identifying a downlink control channel allocated to the user device for each access point of the cluster set of access points.

According to an example implementation, the apparatus may further include means (e.g., 1202A/1202B and/or 1204, FIG. 12) for receiving, by the user device, information from at least one of the access points of the cluster set of access points via a downlink control channel allocated to the user device for the at least one of the access points.

According to an example implementation, the means for determining may include means (e.g., 1202A/1202B and/or 1204, FIG. 12) for determining, by the user device based on the downlink control channel timing information and a beam-switching time for the user device, a downlink control channel allocated to the user device for each access point of a cluster set of access points, wherein the downlink control channels allocated to access points of the cluster set of access points for the user device are separated by at least the beam-switching time for the user device.

FIG. 12 is a block diagram of a wireless station (e.g., AP or user device) 1200 according to an example implementation. The wireless station 1200 may include, for example, one or two RF (radio frequency) or wireless transceivers 1302A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example implementation, RF or wireless transceiver(s) 1202A/1202B may receive signals or data and/or transmit or send signals or data. Processor 1304 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of communicating with a plurality of access points comprising:
    determining, by a user device, downlink control channel timing information for each of a plurality of access points including for a serving access point that serves the user device and one or more standby access points;
    sending, by the user device to a cluster set manager via the serving access point, the downlink control channel timing information for each of the plurality of access points;
    receiving, by the user device from the cluster set manager via the serving access point, downlink control channel allocations including information identifying a downlink control channel allocated to the user device for each of a plurality of the access points, the downlink control channel allocations comprising a downlink control channel allocated to the user device for each of the plurality of the access points, the downlink channels being separated in time by at least a beam-switching time of the user device; and
    receiving, by the user device, information from at least one of the plurality of the access points via a downlink control channel allocated to the user device for the at least one of the plurality of access points.

2. The method of claim 1 wherein the sending comprises:
    sending, by the user device to a cluster set manager via the serving access point, the downlink control channel timing information for each of the plurality of access points, a receiver configuration type for the user device indicating either omnidirectional receiver or beam-formed receiver.

3. The method of claim 2, wherein the sending further comprises the following if the receiver configuration type is a beam-formed receiver:
    sending, by the user device to a cluster set manager via the serving access point, the beam-switching time of the user device.

4. The method of claim 1 wherein the downlink control channel allocations comprise a downlink control channel allocated to the user device for each of a plurality of the access points that do not overlap in time.

5. The method of claim 1 and further comprising:
    receiving, by the user device from each of the plurality of access points via a plurality of beams, synchronization signals;
    determining, by the user device based on the received beams, a best beam for each of the plurality of access points; and
    sending, by the user device to at least one of the plurality of access points, a message indicating the best beam for the at least one of the plurality of access points.

6. The method of claim 5 and further comprising:
    sending, by the user device to the cluster set manager, a message indicating the best beam for the at least one of the plurality of access points.

7. The method of claim 1 and further comprising:
    sending, by the user device to a first standby access point of the one or more standby access points, an uplink resource request and an indication of the downlink control channel allocated to the user device for the first standby access point; and
    receiving, by the user device from the first standby access point, an uplink resource allocation via the downlink control channel allocated to the user device for the first standby access point.

8. The method of claim 1 and further comprising:
    sending, by the user device to a first standby access point of the one or more standby access points, an uplink resource request, wherein the first standby access point was previously notified by the cluster set manager of the downlink control channel allocated to the user device for the first standby access point; and
    receiving, by the user device from the first standby access point, an uplink resource allocation via the downlink control channel allocated to the user device for the first standby access point.

9. The method of claim 1 wherein the receiving, by the user device from the cluster set manager via the serving access point, downlink control channel allocations including a downlink control channel allocated to the user device for each of a plurality of the access points comprises:
    receiving, by the user device from the cluster set manager via the serving access point:
        a first downlink control channel allocated to the user for the serving access point; and
        a second downlink control channel allocated to the user for a first standby access point, wherein the first downlink control channel and the second downlink control channel are non-overlapping in time.

10. An apparatus comprising at least one processor and at least one memory including computer instructions that, when executed by the at least one processor, cause the apparatus to:

determine, by a user device, downlink control channel timing information for each of a plurality of access points including for a serving access point that serves the user device and one or more standby access points;

send, by the user device to a cluster set manager via the serving access point, the downlink control channel timing information for each of the plurality of access points;

receive, by the user device from the cluster set manager via the serving access point, downlink control channel allocations including information identifying a downlink control channel allocated to the user device for each of a plurality of the access points, the downlink control channel allocations comprising a downlink control channel allocated to the user device for each of the plurality of the access points, the downlink control channels being separated in time by at least a beam-switching time of the user device; and receive, by the user device, information from at least one of the plurality of the access points via a downlink control channel allocated to the user device for the at least one of the plurality of access points.

11. A method comprising:

receiving, by a cluster set manager from a user device, downlink control channel timing information for each of a plurality of access points for the user device;

determining, by the cluster set manager, a cluster set of access points for the user device;

determining, by the cluster set manager based on the downlink control channel timing information and a beam-switching time, a downlink control channel allocated to the user device for each access point of the cluster set of access points, wherein the downlink control channels allocated to access points of the cluster set of access points for the user device are separated by at least the beam-switching time; and sending, by the cluster set manager to the user device, the downlink control channel allocations including information identifying a downlink control channel allocated to the user device for each access point of the cluster set of access points.

12. The method of claim 11 wherein the receiving further comprises:

receiving, by the cluster set manager from the user device, a receiver configuration type for the user device indicating either omnidirectional receiver or beam-formed receiver.

13. The method of claim 11 wherein the receiving further comprises:

receiving, by the cluster set manager from the user device:
a receiver configuration type for the user device indicating a beam-formed receiver for the user device; and
the beam-switching time of the user device.

14. The method of claim 11 wherein the determining, by the cluster set manager based on the downlink control channel timing information and the beam-switching time, a downlink control channel allocated to the user device for each access point of the cluster set of access points comprises:

determining, by the cluster set manager based on the downlink control channel timing information and the beam-switching time for the user device, a location constraint for allocation of a downlink control channel in a slot of an access point of the cluster set;

sending, by the cluster set manager to the access point, a request for an allocation by the access point of a downlink control channel for the user device satisfying the location constraint; and receiving, by the cluster set manager from the access point, an allocation by the access point of a downlink control channel for the user device.

15. The method of claim 11 and further comprising:

sending, by the cluster set manager to each of the access points of the cluster set for the user device, information identifying the downlink control channel allocated to the user device for a corresponding access point of the cluster set of access points.

16. The method of claim 11 wherein the sending, by the cluster set manager to each of the access points of the cluster set for the user device, the downlink control channel allocated to the user device for a corresponding access point of the cluster set of access points comprises:

sending, by the cluster set manager to a first access point of the cluster set of access points, information identifying a first downlink control channel allocated to the user device for the first access point; and sending, by the cluster set manager to a second access point of the cluster set of access points, information identifying a second downlink control channel allocated to the user device for the second access point, wherein the first downlink control channel and the second downlink control channel are separated by at least the beam-switching time for the user device.

17. The method of claim 11 wherein the cluster set manager is a cluster set manager configured to manage the plurality of access points of the cluster set for the user device.

18. An apparatus comprising at least one processor and at least one memory including computer instructions that, when executed by the at least one processor, cause the apparatus to:

receive, by a cluster set manager from a user device, downlink control channel timing information for each of a plurality of access points for the user device;

determine, by the cluster set manager, a cluster set of access points for the user device;

determine, by the cluster set manager based on the downlink control channel timing information and a beam-switching time, a downlink control channel allocated to the user device for each access point of the cluster set of access points, wherein the downlink control channels allocated to access points of the cluster set of access points for the user device are separated by at least the beam-switching time; and send, by the cluster set manager to the user device, the downlink control channel allocations including information identifying a downlink control channel allocated to the user device for each access point of the cluster set of access points.

19. A method comprising:

determining, by a user device, downlink control channel timing information for each of a plurality of access points including for a serving access point that serves the user device and one or more standby access points;

determining, by the user device based on the downlink control channel timing information and a beam-switching time for the user device, a downlink control channel allocated to the user device for each access point of a cluster set of access points, wherein the downlink control channels allocated to access points of the cluster set of access points for the user device are separated by at least the beam-switching time for the user device; and sending, by the user device to a cluster set manager, the downlink control channel allocations including information identifying a downlink control channel allocated to the user device for each access point of the cluster set of access points.

20. The method of claim 19 and further comprising:
receiving, by the user device, information from at least one of the access points of the cluster set of access points via a downlink control channel allocated to the user device for the at least one of the access points.

21. An apparatus comprising at least one processor and at least one memory including computer instructions that, when executed by the at least one processor, cause the apparatus to:
determine, by a user device, downlink control channel timing information for each of a plurality of access points including for a serving access point that serves the user device and one or more standby access points;
determine, by the user device based on the downlink control channel timing information and a beam-switching time for the user device, a downlink control channel allocated to the user device for each access point of a cluster set of access points, wherein the downlink control channels allocated to access points of the cluster set of access points for the user device are separated by at least the beam-switching time for the user device; and
send, by the user device to a cluster set manager, the downlink control channel allocations including information identifying a downlink control channel allocated to the user device for each access point of the cluster set of access points.

* * * * *